United States Patent
Ahn et al.

(10) Patent No.: US 10,162,423 B2
(45) Date of Patent: Dec. 25, 2018

(54) IMAGE DISPLAY APPARATUS AND OPERATION METHOD THEREOF

(71) Applicant: LG ELECTRONICS INC., Seoul (KR)

(72) Inventors: Wooseok Ahn, Seoul (KR); Sangkyu Kang, Seoul (KR); Hyeongchul Oh, Seoul (KR); Sewon Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 25 days.

(21) Appl. No.: 15/316,452

(22) PCT Filed: Jul. 8, 2014

(86) PCT No.: PCT/KR2014/006080
§ 371 (c)(1),
(2) Date: Dec. 5, 2016

(87) PCT Pub. No.: WO2015/186857
PCT Pub. Date: Dec. 10, 2015

(65) Prior Publication Data
US 2017/0139482 A1    May 18, 2017

(30) Foreign Application Priority Data
Jun. 3, 2014  (KR) ........................ 10-2014-0067920

(51) Int. Cl.
| G06T 7/20 | (2017.01) |
| G06F 3/01 | (2006.01) |
| H04N 21/4227 | (2011.01) |
| G06F 3/00 | (2006.01) |

(Continued)

(52) U.S. Cl.
CPC .............. G06F 3/017 (2013.01); G06F 3/005 (2013.01); H04N 21/4227 (2013.01);
(Continued)

(58) Field of Classification Search
CPC .......... A63F 13/428; G06F 3/005; G06F 3/01; G06F 3/011; G06F 3/017; G06F 17/2872;
(Continued)

(56) References Cited

U.S. PATENT DOCUMENTS

| 9,857,876 B2 * | 1/2018 | Hare .................. G06F 3/0304 |
| 2011/0154266 A1 * | 6/2011 | Friend ................... A63F 13/06 715/863 |

(Continued)

FOREIGN PATENT DOCUMENTS

| KR | 10-2013-0105321 A | 9/2013 |
| KR | 10-2014-0035244 A | 3/2014 |

(Continued)

*Primary Examiner* — Michael J Eurice
(74) *Attorney, Agent, or Firm* — Birch, Stewart, Kolasch & Birch, LLP

(57) ABSTRACT

A method of operating the video display device according to the embodiment of the present invention comprises acquiring a video of a video display device associated with a user; recognizing a gesture of the user in the acquired video; calculating a control amount with regard to the gesture based on the recognized gesture; and performing the control operation corresponding to the recognized gesture and the calculated control amount.

17 Claims, 27 Drawing Sheets

(51) Int. Cl.
    *G06F 3/03*     (2006.01)
    *A63F 13/428*   (2014.01)
    *G06T 7/00*     (2017.01)
    *G06T 7/246*    (2017.01)
    *G06F 17/28*    (2006.01)
    *G06K 9/00*     (2006.01)
    *G09B 21/00*    (2006.01)
    *G06T 7/254*    (2017.01)
    *G06K 9/20*     (2006.01)

(52) U.S. Cl.
    CPC .............. *A63F 13/428* (2014.09); *G06F 3/01* (2013.01); *G06F 3/011* (2013.01); *G06F 3/03* (2013.01); *G06F 17/2872* (2013.01); *G06K 9/00* (2013.01); *G06K 9/00355* (2013.01); *G06K 9/20* (2013.01); *G06T 7/00* (2013.01); *G06T 7/20* (2013.01); *G06T 7/251* (2017.01); *G06T 7/254* (2017.01); *G09B 21/009* (2013.01)

(58) Field of Classification Search
    CPC ........ G06F 3/03; G06K 9/00; G06K 9/00355; G06K 9/20; G06T 7/00; G06T 7/20; G06T 7/251; G06T 7/254; G09B 21/009; H04N 21/4227
    See application file for complete search history.

(56) References Cited

U.S. PATENT DOCUMENTS

| | | | |
|---|---|---|---|
| 2011/0262006 A1* | 10/2011 | Nakano | G06F 3/011 382/103 |
| 2011/0286676 A1* | 11/2011 | El Dokor | G06F 3/017 382/225 |
| 2013/0241819 A1* | 9/2013 | Yamashita | G06F 3/017 345/156 |
| 2014/0010441 A1* | 1/2014 | Shamaie | G06K 9/00355 382/164 |
| 2014/0071044 A1* | 3/2014 | Nam | G06F 3/011 345/156 |
| 2014/0201666 A1* | 7/2014 | Bedikian | G06F 3/017 715/771 |
| 2015/0029092 A1* | 1/2015 | Holz | G06F 3/017 345/156 |
| 2015/0103004 A1* | 4/2015 | Cohen | G06F 3/0483 345/158 |

FOREIGN PATENT DOCUMENTS

| | | |
|---|---|---|
| KR | 10-2014-0046197 A | 4/2014 |
| KR | 10-1396488 B1 | 5/2014 |

* cited by examiner

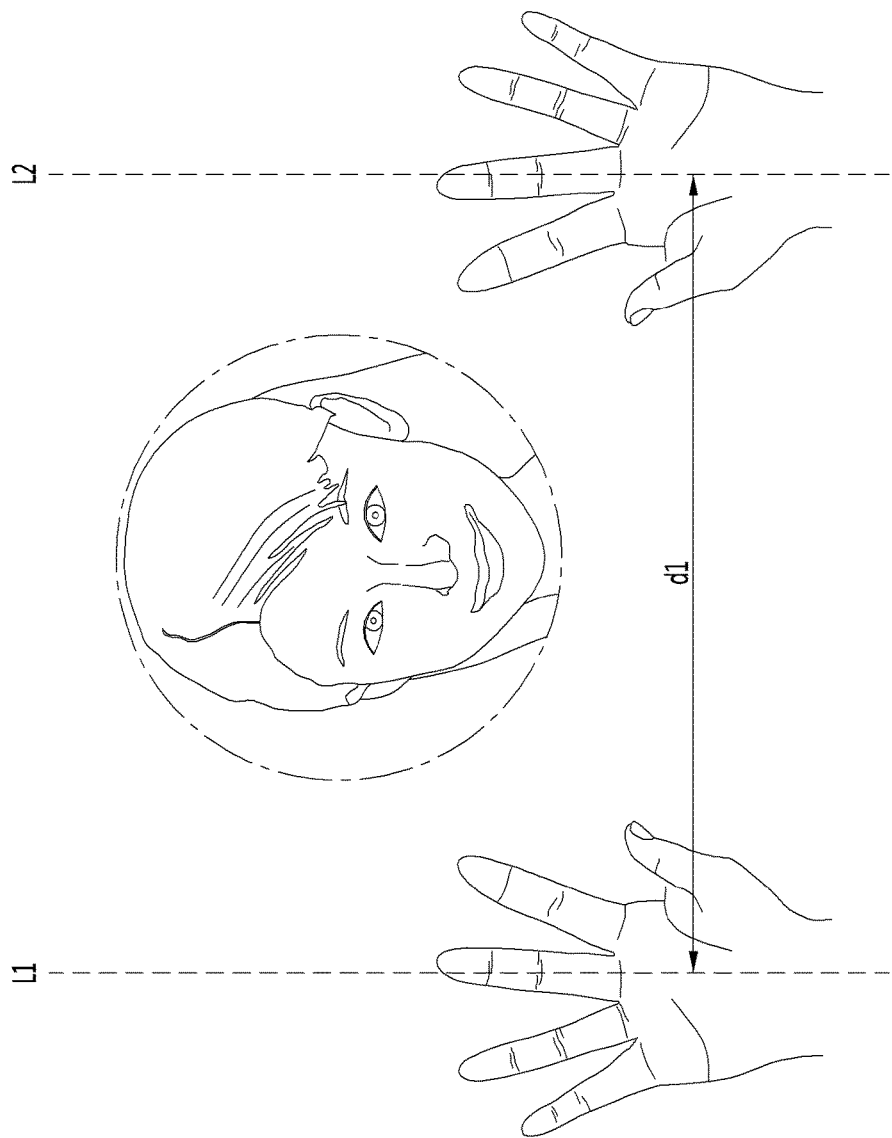

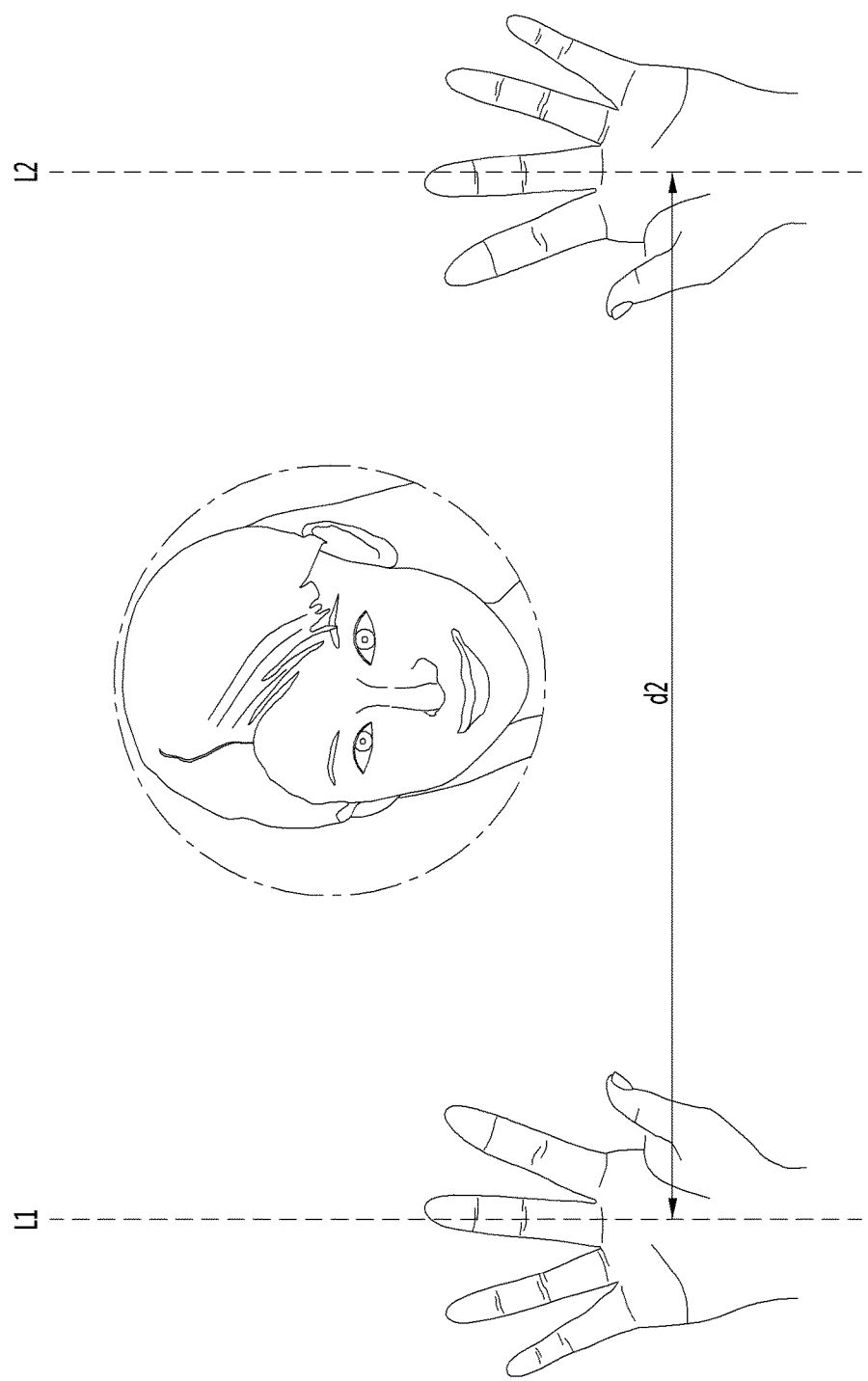

(a)

(b)

(a)

(b)

(a)

(b)

IMAGE DISPLAY APPARATUS AND OPERATION METHOD THEREOF

CROSS REFERENCE TO RELATED APPLICATIONS

This application is the National Phase of PCT International Application No. PCT/KR2014/006080, filed on Jul. 8, 2014, which claims priority under 35 U.S.C. 119(a) to Patent Application No. 10-2014-0067920, filed in the Republic of Korea on Jun. 3, 2014, all of which are hereby expressly incorporated by reference into the present application.

TECHNICAL FIELD

The present invention relates to a video display device and an operating method thereof, and, more particularly, to a video display device and an operating method thereof which recognize a gesture of a user and provides the control operation corresponding to the recognized gesture.

BACKGROUND

Recently, digital TV services using wired or wireless communication networks have been generalized. The digital TV services can provide various services which have not been provided in the existing analog broadcasting services.

For example, an Internet protocol television (IPTV) service or a mart TV service, which is one type of the digital TV services, is a bidirectional service which allows a user to actively select the kind, viewing time, or the like of a program to be watched. The IPTV service or the smart TV service can provide various additional services, for example, Internet search, home shopping, on-line games, and the like, based on the bidirectional service capability.

Meanwhile, the recent smart TV may recognize a gesture of a user and perform a control operation corresponding to the recognized gesture. However, the gesture of the user which the smart TV may recognize is limited and there is a problem that it is difficult to input a control amount, such as the volume of sound, with only the gesture. Accordingly, the smart TV recognizes a combination of a plurality of gestures of the user and provides the various control operations. However, the method of recognizing the combination of the plurality of gestures of the user has the difficulty which the user has to memorize the plurality of each gestures and there is a limitation that the combination of the plurality of gestures are not intuitive to the user.

DISCLOSURE

Technical Problem

It is an aim of the present invention to recognize a gesture of a user and provides a control operation and a control amount corresponding to the recognized gesture.

It is an aim of the present invention to provide a control operation that the user pursues and the control amount with regard to the control operation with only one gesture.

Technical Solution

The method of operating the video display device according to the embodiment of the present invention is acquiring the video with regard to the user of the video display device; recognizing the gesture of the user in the acquired video; calculating the control amount with regard to the gesture based on the recognized gesture; and performing the control operation in response to the recognized gesture and the calculated gesture.

The video display device according to the embodiment of the present invention includes the video acquisition unit acquiring the video associated with the user of the video display device; and the control unit which recognizes the gesture of the user in the acquired video associated with the user, calculates the control amount with regard to the gesture based on the recognized gesture, and performs the recognized gesture and the control operation in response to the calculated control amount.

Advantageous Effects

According to the various embodiments of the present invention, the present invention may recognize the control operation which the control amount is required with only one gesture, and, thus, perform the desired control operation with only one gesture by the user.

Further, the present invention provides the intuitive input method with regard to the control amount, and, thus, may provide the intuitive gesture to the user.

BRIEF DESCRIPTION OF THE DRAWINGS

FIGS. 7A to 7C show the left-right gesture according to another embodiment of the present invention.

DETAILED DESCRIPTION OF THE EMBODIMENTS

Hereinafter, embodiments relating to the present invention will be described in detail with reference to the accompanying drawings. The suffixes "module" and "unit" for components used in the description below are assigned or mixed in consideration of easiness in writing the specification and do not have distinctive meanings or roles by themselves.

A screen display control method and a video display device using the same according to an embodiment will be described in detail with reference to the accompanying drawings.

A video display device according to embodiments is an intelligent video display device that, for example, a computer supporting function is added to a broadcast receiving function. The video display device may be equipped with a convenient to use interface such as a written type input device, touch screen, or spatial remote control unit due to addition of the internet function while sticking by the broadcast receiving function. In addition, the video display device may also access the internet and a computer by a support of wired or wireless communication, and perform functions of email, web browsing, banking or game. For these various functions, a standardized general purpose OS may be used.

Therefore, a video display device described here may perform various user-friendly functions, because various applications may be freely added to or removed from a kernel of the general purpose OS. The video display device may be, as a detailed example, a network TV, a hybrid broadcast broadband (HBB) TV, a smart TV, an LED TV, or an OLED TV, and may also be applied to a smart phone in some cases.

Figure 1:
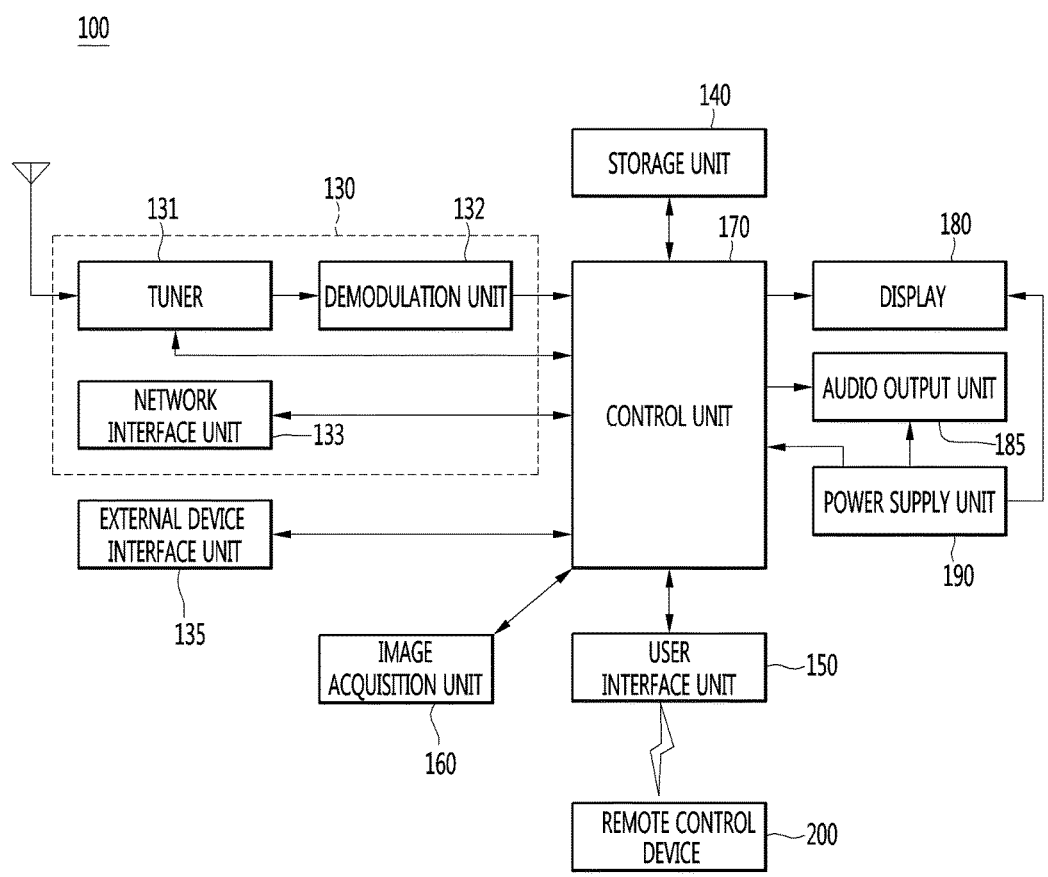
FIG. 1 is a block diagram illustrating a configuration of a video display device according to an embodiment of the present invention.

FIG. 1 is a block diagram illustrating a configuration of a video display device according to an embodiment.

Referring to FIG. 1, a video display device 100 may include a broadcast receiving unit 130, an external device interface unit 135, a storage unit 140, a user input interface unit 150, an video acquisition unit 160, a control unit 170, a display unit 180, an audio output unit 185, and a power supply unit 190. The broadcast receiving unit 130 may include a tuner 131, a demodulation unit 132, and a network interface unit 133.

The external interface unit 135 may receive an application or an application list in an adjacent external device, and deliver it to the control unit 170 or the storage unit 140.

The external device interface unit 135 may include a terminal to connect to an external device, so that it may be connected to a connector of the external device.

The external device interface unit 135 may supply a power received from the power supply unit 190 to a connected external device as driving power.

Additionally, the external device interface unit 135 may deliver an operation signal that an external device transmits to the control unit 170.

On the other hand, the external device interface unit 135 may deliver a voice signal that the control unit 170 transmits to an external device.

Moreover, the external device interface unit 135 may include a sensor detecting a connection of an external device, so that it may recognize the connection.

The network interface unit 133 may provide an interface for connecting the video display device to a wired/wireless network including the internet. The network interface unit 133 may transmit or receive data to or from another user or another electronic device through an accessed network or another network linked to the accessed network.

In addition, the network interface unit 133 may transmit some of content data stored in the video display device 100 to a selected user or a selected electronic device among other users or other electronic devices pre-registered for the video display device 100.

The network interface unit 122 may access a certain web page through an accessed network or another network linked to the accessed network. In other words, the network interface unit 122 may access a certain web page through the network and transmit or receive data to or from a corresponding server.

In addition, the network interface unit 133 may receive content or data provided by a content provider or a network operator. In other words, the network interface unit 133 may receive content such as movie, advertisement, game, VOD, broadcast signal and information related thereto provided from the content provider or the network operator through the network.

In addition, the network interface unit 133 may receive firmware update information or update files provided by the network operator, and transmit data to the internet, content provider, or the network operator.

The network interface unit 133 may select and receive desired applications among applications opened in public through the network.

The storage unit 140 may store videos, voices, or data signals stored and signal-processed by programs for signal-processing and controlling in the control unit 170.

In addition, the storage unit 140 may perform a function of temporarily storing videos, voices, or data signals input from the external interface unit 135 or the network interface unit 133, and may store information on videos through a channel memory function.

The storage unit 140 may store an application or an application list input from the external interface unit 135 or the network interface unit 133.

The video display device 100 may play, to the user, content files (a video file, a still video file, a music file, a document file, an application file, etc.) stored in the storage unit 140.

The user input interface unit 150 may deliver a signal input by the user to the control unit 170, or deliver a signal from the control unit 170 to the user. For example, the user input interface unit 150 may receive and process a control signal such as power on/off, channel selection, or screen setting from the remote control unit 200, or transmits a control signal from the control unit 170 to the remote control unit 200 according to various communication schemes such as Bluetooth, ultra wideband (WB), ZigBee, radio frequency (RF) communication, and infrared (IR) communication.

In addition, the user input interface unit 150 may deliver a control signal input through a power key, a channel key, a volume key, or a local key (not shown) for a setting value, etc.

The video acquisition unit 160 may acquire a video.

The video acquisition unit 160 may include at least one camera and thus, may acquire an video through an included camera.

Then, the video acquisition unit 160 may deliver the acquired video to the control unit 170.

An video signal video-processed by the control unit 170 may be input to the display unit 180 and displayed as an video corresponding to the corresponding video signal. In addition, the video signal video-processed by the control unit 170 may be input to an external output unit through the external device interface unit 135.

A voice signal processed by the control unit 170 may be audio-output to the audio output unit 185. In addition, the voice signal processed by the control unit 170 may also be input to the external output device through the external device interface unit 135.

In addition, the control unit 170 may control overall operation in the video display device 100.

The control unit 170 receives a detection signal for a connection of an external device from the external device interface unit 135 and may then control the power supply unit 190 so that driving power is delivered to an external device connected to the external device interface unit 135.

Furthermore, the control unit 170 may recognize a user's gesture included in a video on the basis of the video acquired through the video acquisition unit 160. Then, the control unit 170 may perform a control operation corresponding to the recognized user's gesture.

The control unit 170 may also control the video display device 100 by means of user commands input through the user input interface unit 150 or internal programs, and access a network and allow the user to download a desired application or application list to the video display device 100.

The control unit 170 may allow user-selected channel information to be output together with the processed video or voice signal through the display unit 180 or the audio output unit 185.

In addition, the control unit 170 may allow an video signal or a voice signal input through the external device interface unit 135 from an external device, for example, a camera or a camcorder to be output to the display unit 180 or the audio output unit 185 according to an external device video playback command received through the user input interface unit 150.

On the other hand, the control unit 170 may control the display unit 180 so as to display an video, and control so that a broadcast video input through the tuner 131, an external input video input through the external interface unit 135, an video input through the network interface unit, or an video stored in the storage unit 140 is displayed on the display unit 180. In this case, the video displayed on the display unit 180 may be a still video or a video, or a 2-dimensional (2D) or 3-dimensional (3D) video.

The control unit 170 may also control so that content stored in the video display device 100, received content, or externally input content is played, and the content may have various types including a broadcast video, an externally input image, an audio file, a still video, an accessed web screen, and a document file.

The display unit 180 may convert an video signal, a data signal, or an OSD signal processed by the control unit 170, or an video signal, or a data signal received by the external device interface unit 135 into an RGB signal, and generate a driving signal.

On the other hand, the video display device 100 illustrated in FIG. 1 is merely an embodiment, and some of the illustrated elements may be integrated, added or omitted according to specification of the actually implemented video display device 100.

In other words, in some cases, two or more elements may be integrated into one element, or one element may be divided into two or more elements. In addition, a function performed by each block is for explaining an embodiment, and detailed operations or devices thereof are not limit the scope of the present invention.

According to another embodiment, the video display device 100 may receive an video through the network interface unit 133 or the external device interface unit 135 and play the video without including the tuner 131 and the demodulation unit 132, which is different from as shown in FIG. 1.

For example, the video display device 100 may be implemented as divided into an video processing device such as a set top box for receiving a broadcast signal or contents according to various network service, and a content playing device playing contents input from the video processing device.

In this case, an video displaying method according to an embodiment to be described below may be executed by not only the video display device 100 as described above with reference to FIG. 1, but also the video processing device such as the divided set top box or content playing device including the display unit 180 and audio output unit 185.

Next, a remote control unit according to an embodiment is described with reference to FIGS. 2 and 3.

Figure 2:
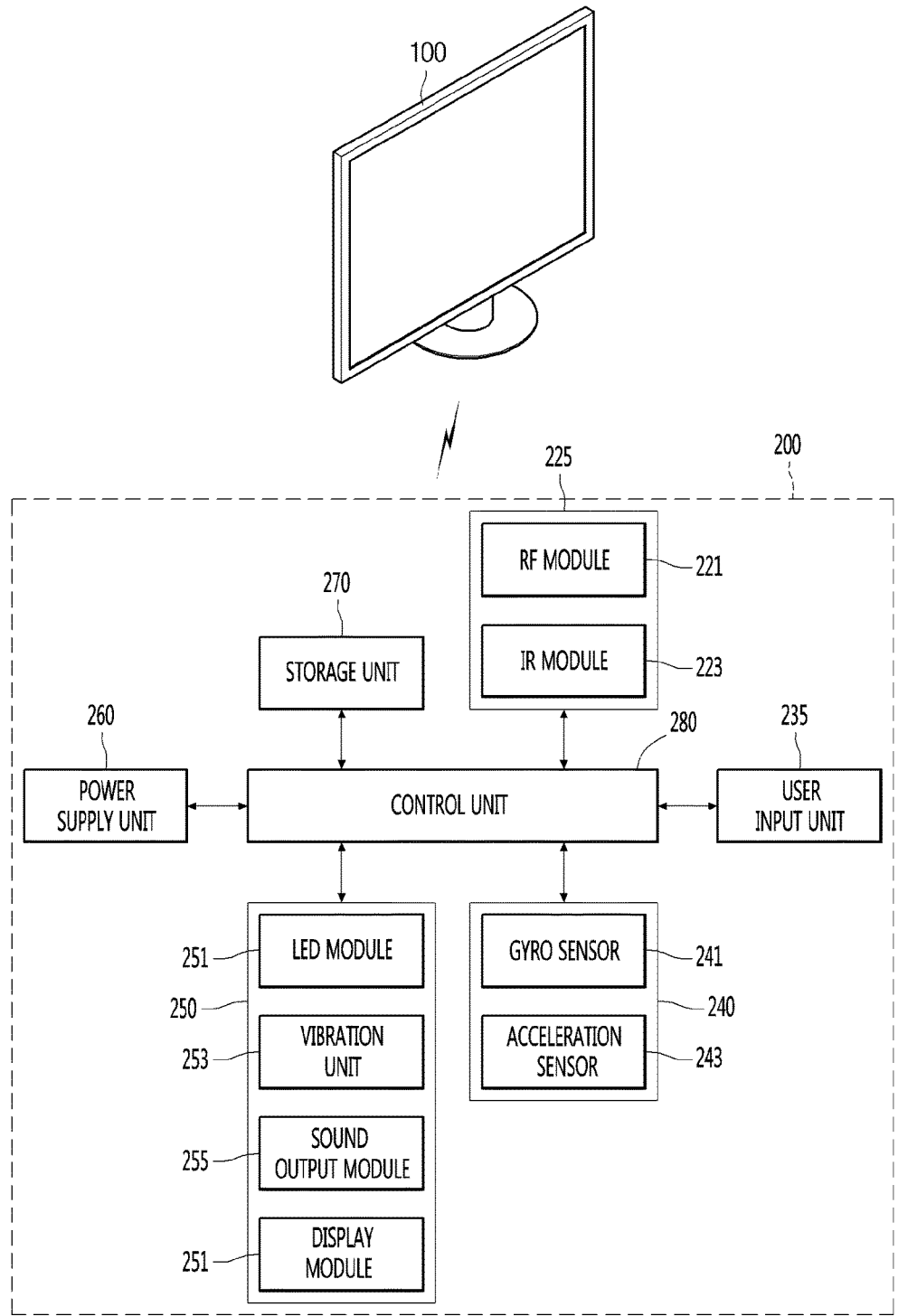
FIG. 2 is a block diagram of a remote control device according to an embodiment of the present invention.
Figure 3:
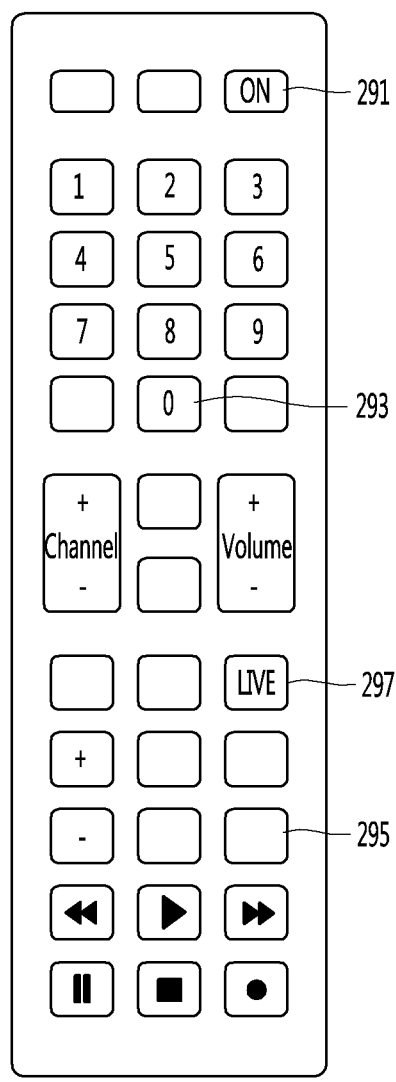
FIG. 3 is a block diagram illustrating an actual configuration of a remote control device according to an embodiment of the present invention.

FIG. 2 is a block diagram illustrating a remote control unit and FIG. 3 illustrates an exemplary configuration of a remote control unit according to an embodiment.

First, as illustrated in FIG. 2, the remote control unit 200 may include a wireless communication unit 225, a user input unit 235, a sensor unit 240, an output unit 250, a power supply unit 20, a storage unit 270, and a control unit 280.

As illustrated in FIG. 2, the wireless communication unit 225 transmits and receives a signal with any one of the above-described video display devices.

The remoter control unit 200 may include an RF module 221 that is capable of transmitting and receiving a signal with the video display device 100 according to RF communication specification, and include an IR module 223 that is capable of transmitting and receiving a signal with the video display device 100 according to IR communication specification.

In addition, the remote control unit 200 may transmit a signal having information on movement of the remote control unit 200 therein to the video display device 100 through the RF module 221.

Furthermore, the remote control unit 200 may receive a signal transmitted by the video display device 100 through the RF module 221, and transmit a command such as power on/off, channel change, or volume change to the video display device 100 through the IR module 223 in some cases.

The user input unit 235 may include a keypad, buttons, a touch pad, or a touch screen, etc. The user may manipulate the user input unit 235 and input commands related to the video display device 100 to the remote control unit 235. When the user input unit 235 includes a hard key button, the user may input commands related to the video display device 100 to the remote control unit 200 through a push operation to the hard key button. Regarding this, description is made with reference to FIG. 3.

Furthermore, the interworking device 99 shown in FIG. 2 indicates an external device interworking with the video display device of the embodiment and includes, but not limited to, both of a user's health information sensing device and a user's body information sensing device.

As illustrated in FIG. 3, the remote control unit 200 may include a plurality of buttons. The plurality of buttons may include a power button 291, a channel button 293, an emotion mode button 295 and a LIVE button 297.

The power button 291 may be a button for turning on/off power of the video display device 100.

The channel button 293 may be a button for receiving a broadcast signal of a specific broadcast channel.

The emotion mode button 295 may be a button for entering an emotion mode to be described later.

The LIVE button 297 may be a button for displaying a broadcast program in real time.

Description is made with reference to FIG. 2 again.

When the user input unit 235 includes a touch screen, the user may input commands related to the video display device 100 to the remote control unit 200 by touching soft keys on the touch screen. In addition, the user input unit 235 may include various kinds of input units operable by the user including a scroll key or a jog key, etc., and the embodiment does not limit the scope of the present invention.

The sensor unit 240 may include a gyro sensor 241 or an acceleration sensor 243, and the gyro sensor 241 may sense information on movement of the remote control unit 200.

For example, the gyro sensor 241 may sense information on the movement of the remote control unit 200 on the basis of x, y, z axes, and the acceleration sensor 243 may sense information on a movement speed of the remote control unit 200. In addition, the remote control unit 200 may further include a distance measuring sensor and sense a distance to the display unit 180 of the video display device 100.

The output unit 250 may output videos or voice signals corresponding to manipulation of the user input unit 235 or corresponding to a signal transmitted by the video display device 100. Through the output unit 250, the user may recognize whether the user input unit 235 is manipulated or whether the video display device 100 is controlled.

For example, the output unit 250 may include an LED module 251 turned on, a vibration module 253 generating vibration, a sound output module 255 outputting a sound, or a display module 257 outputting an video, when the user input unit 235 is manipulated or signals are transmitted and received with the video display device 100 through the wireless communication unit 225.

In addition, the power supply unit 260 supplies power to the remote control unit 200. When the remote control unit 200 is not moved for a predetermined time, the power supply unit 260 stops supplying power to the remote control unit 200 and may reduce power waste. The power supply unit 260 may resume supplying power when a certain key prepared in the remote control unit 200 is manipulated.

The storage unit 270 may store various kinds of programs necessary for controlling or operating the remote control unit 200 or application data. When the remote control unit 200 wirelessly transmits and receives signals with the video display device 100 through the RF module 221, the remote control unit 200 and the video display device 100 transmit and receive signals through a certain frequency band.

The control unit 280 of the remote control unit 200 may store, in the storage unit 270, and refer to information on a frequency band through which signals are wirelessly transmitted and received with the video display device 100 paired with the remote control unit 200.

The control unit 280 controls overall items related to controls of the remote control unit 200. The control unit 280 may transmit, to the video display device 100 through the wireless communication unit 225, signals corresponding to manipulation of a certain key of the user input unit 235 or corresponding to the movement of the remote control unit 200, which is sensed by the sensor unit 240.

Hereinafter, a method of operating the video display device 100 will be described with reference to FIG. 4.

Figure 4:
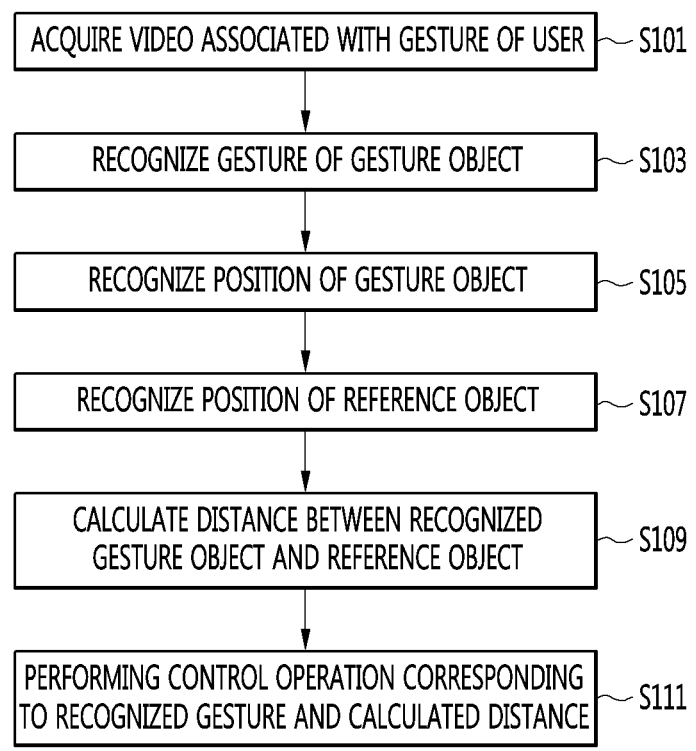
FIG. 4 is a flowchart illustrating a method of operating a video display device according to an embodiment of the present invention.

FIG. 4 is a flowchart illustrating a method of operating the video display device 100 according to an embodiment of the present invention.

Referring to FIG. 4, the video acquisition unit 160 of the video display device 100 acquires a video with regard to the gesture of the user (S101).

The video acquisition unit 160 may acquire the video associated with the user via the camera included in the video acquisition unit 160.

Figure 5:
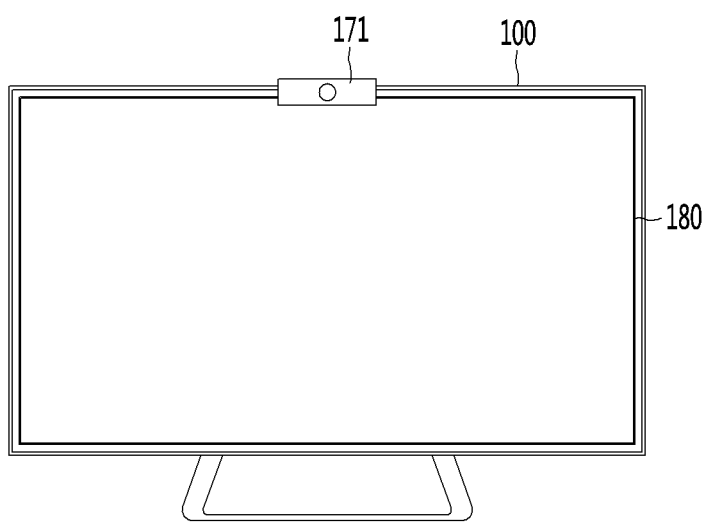
FIG. 5 is an exemplary diagram for illustrating the video acquisition of a video acquisition unit according to an embodiment of the present invention.

Referring to FIG. 5, the video acquisition with regard to the gesture operation of the user of the video acquisition unit 160 according to an embodiment of the present invention will be described below.

FIG. 5 is an exemplary diagram for illustrating the video acquisition of the video acquisition unit 160 according to an embodiment of the present invention.

Referring to FIG. 5, the video acquisition unit 160 is provided in the front side of the video display device 100 and acquires the video. Accordingly, the video acquisition unit 160 may acquire the video associated with the user using the video display device 100.

According to an embodiment, the video acquisition unit 160 may acquire the video associated with the user via the camera provided in the front side of the video display device 100. The video acquisition unit 160 transmits the acquired video associated with the user to the control unit 170. The video with regard to the gesture operation of the user may be included in the acquired video associated with the user.

Meanwhile, the camera is not included in the video display device 100 and may be also provided separately.

The video display device 100 recognizes the gesture of the user based on the acquired video with regard to the gesture of the user (S103).

The control unit 170 of the video display unit 100 may recognize the gesture of the user based on the video with regard to the gesture of the user, which is acquired by the video acquisition unit 160.

As an embodiment, the control unit 170 may detect a gesture object area from the acquired video associated with the user. The control unit 170 may recognize one or more of a shape and a movement of a gesture object in the detected gesture object area. Further, if one or more of the shape and the movement of the recognized gesture object are determined as matching one or more of a shape and a movement of a previously stored gesture object, the control unit 170 may recognize one or more of the shape and the movement of the recognized gesture object as the gesture of the user.

The gesture object may include a part of the body of the user, such as hand, finger, foot, head, and face. Further, the gesture object area may be an area in which the gesture object including a part of the body of the user is located in the acquired video with regard to the gesture of the user.

The video display device 100 recognizes a position of the gesture object (S105).

The control unit 170 of the video display device 100 may recognize a position of the gesture object in the acquired video.

As an embodiment, the control unit 170 may recognize a position of a hand which is the gesture object in the acquired video.

As another embodiment, the control unit 170 may recognize a position of a finger which is the gesture object in the acquired video.

As another embodiment, the control unit 170 may recognize a position of a head which is the gesture object in the acquired video.

The gesture object may include the part of the body of the user, such as the hand, the finger, the foot, the head, and the face. One or more gesture objects may be set, and, thus, a plurality of objects may be also set as the gesture object.

Further, the gesture object may be selected in various ways according to the selection of the user or a designer.

Meanwhile, step S105 may be included in S109 step to be described below.

The video display device 100 recognizes a position of a reference object (S107).

The control unit 170 of the video display device 100 may recognize the position of the reference object in the acquired video.

As an embodiment, the control unit 170 may recognize the position of a head which is the reference object in the acquired video.

As another embodiment, the control unit 170 may recognize the position of a hand which is the reference object in the acquired video. Herein, the hand which is the reference object may be identical to or different from the hand which is the gesture object.

As another embodiment, the control unit 170 may recognize the position of the finger which is the reference object in the acquired video. In this case, the finer which is the reference object may be identical to or different from the finger which is the gesture object.

In this case, the reference object may include the part of the body of the user such as the hand, the finger, the foot, the head, and the face. One or more reference objects may be set and, thus, a plurality of objects may be set as reference objects. Further, the reference object may be selected in various ways according to the selection of the user or the designer.

Meanwhile, step S107 may be included in step S109 to be described below.

The video display device 100 calculates a distance between the recognized gesture object and the reference object (S109).

The control unit 170 of the video display device 100 may calculate the distance between the gesture object and the reference object based on the position of the recognized gesture object and the position of the reference object.

Details will be described below with reference to FIGS. 6A, 7A, 8A and 9A.

Figure 6A:
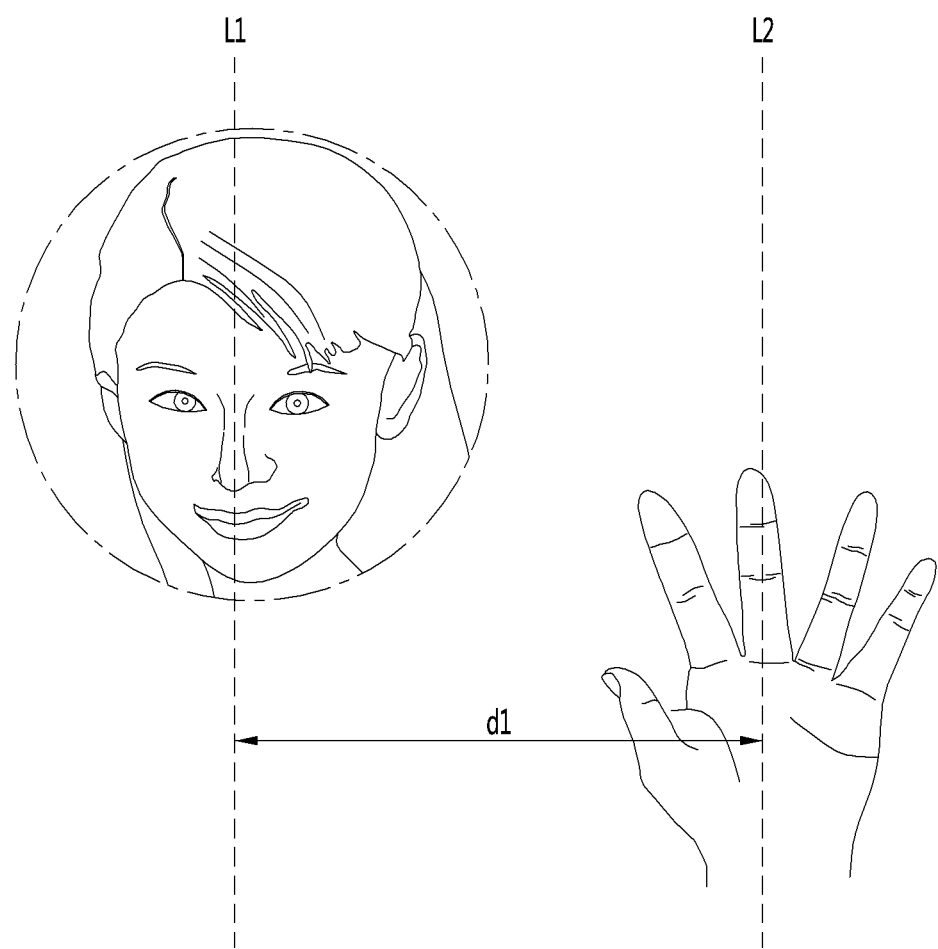
FIGS. 6A to 6D show the gesture in the left-right directions according to an embodiment of the present invention.

FIG. 6A shows the gesture of the user in the left and right directions according to an embodiment of the present invention.

Referring to FIG. 6A, the video display device 100 may recognize the position of the head of the user which is the reference object and the hand which is the gesture object in the acquired video. Further, the video display device 100 may calculate a distance between a center of the reference object and a center of the gesture object. As an embodiment, the video display device 100 may calculate distance d1 a baseline L1 corresponding to the center of the head which is the reference object and a baseline L2 corresponding to the center of the hand which is the gesture object.

FIG. 7A shows a left-right gesture of the user according to another embodiment of the present invention.

Referring to FIG. 7A, the video display device 100 may recognize a position of the left hand of the user which is the reference object and a position of the right hand which is the gesture object in the acquired video. Further, the video display device 100 may calculate a distance between a center of the reference object and a center of the gesture object. As an embodiment, the video display device 100 may calculate a distance d1 between the baseline L1 corresponding to the center of the left hand which is the reference object and the baseline L2 corresponding to the center of the right hand which is the gesture object. Meanwhile, in FIG. 7A, the video display device 100 may recognize the right hand as the reference object and recognize the left hand as the gesture object in the acquired video.

Figure 8A:
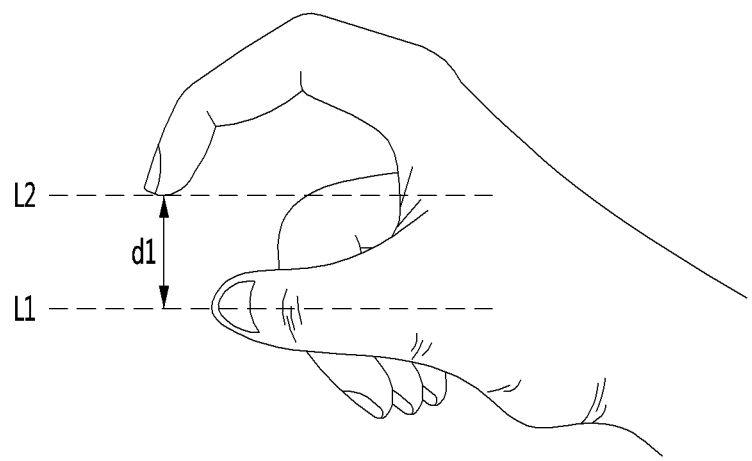
FIGS. 8A to 8C show a finger gesture of the user according to an embodiment of the present invention.

FIG. 8A is an exemplary diagram showing a finger gesture of the user according to another embodiment of the present invention.

Referring to FIG. 8A, the video display device 100 may recognize a position of a thumb of the user which is the reference object and a position of an index finger which is the gesture object in the acquired video. Further, the video display device 100 may calculate a distance between the center of the reference object and the center of the gesture object. As an embodiment, the video display device 100 may calculate a distance d1 between the baseline L1 corresponding to the center of the thumb which is the reference object and baseline L2 corresponding to the center of the index finger. Meanwhile, in FIG. 8A, the video display device 100 may recognize the thumb as the reference object and recognize the index finger as the gesture object in the acquired video.

Figure 9A:
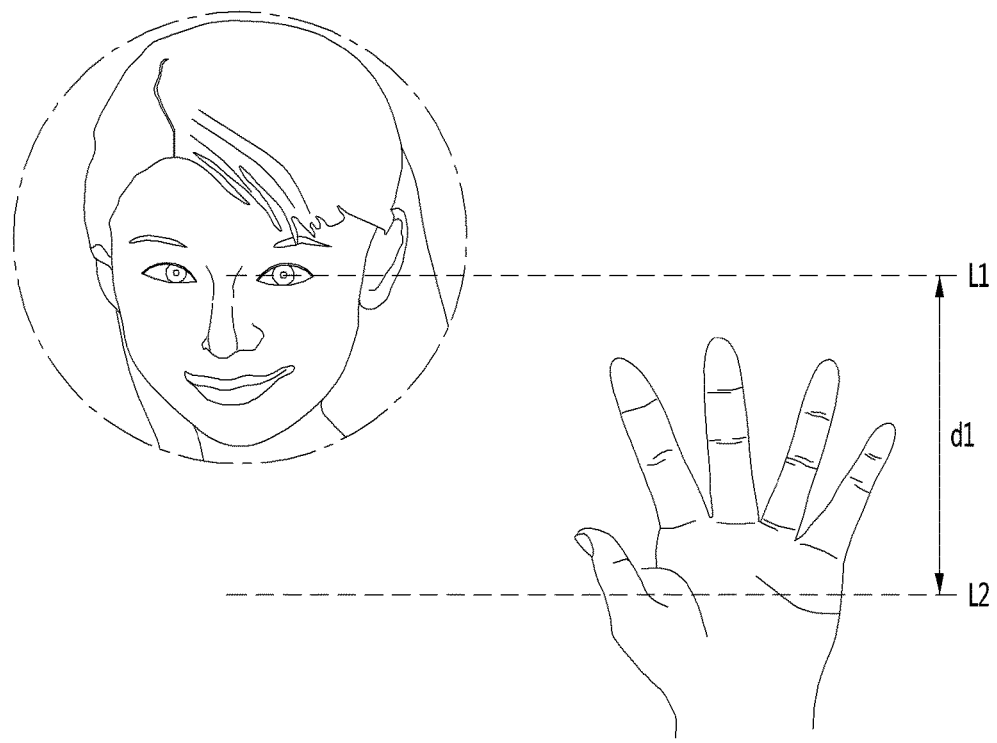
FIGS. 9A to 9C are the up-down gesture according to an embodiment of the present invention.

FIG. 9A is an exemplary diagram showing the up-down gesture of the user according to another embodiment of the present invention.

Referring to FIG. 9a, the video display device 100 may recognize a position of the head of the user which is the reference object and a position of the hand which is the gesture object. Further, the video display device 100 may calculate a distance between the center of the reference object and the center of the gesture object. As an embodiment, the video display device 100 may calculate a distance d1 between the baseline L1 corresponding to the center of the head which is the reference object and baseline L2 corresponding to the center of the hand which is the gesture object.

Meanwhile, the video display device 100 may also calculate the distance between the reference object and the gesture object based on one or more of the area, the size, the length of each of the reference object and the gesture object, and the ratio between the reference object and the gesture object.

Details will be described below with reference to FIGS. 10A to 13.

Figure 10A:
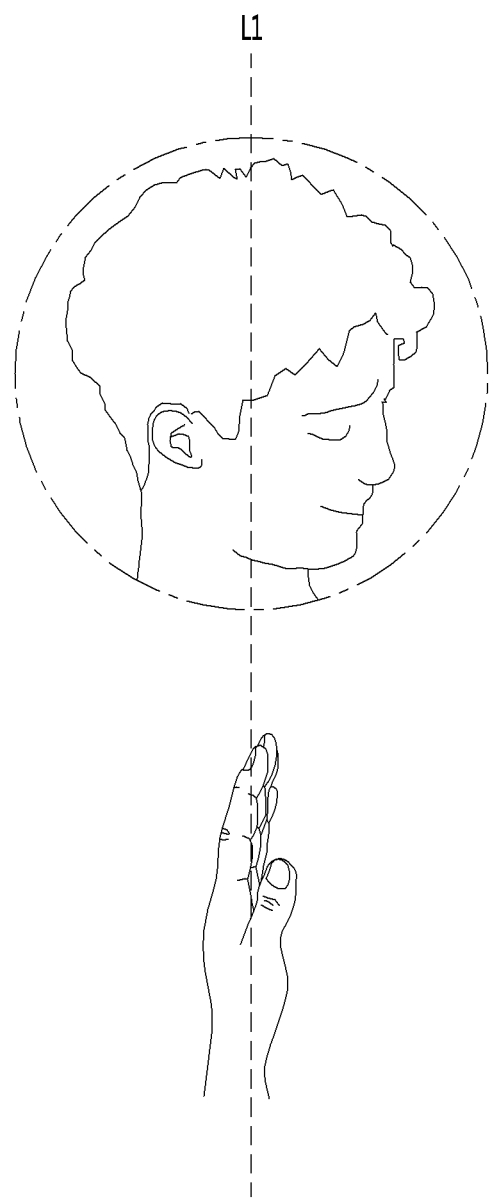
FIGS. 10A to 10B show the exemplary diagrams with regard to the forward-backward gesture recognition according to an embodiment of the present invention.
Figure 10B:
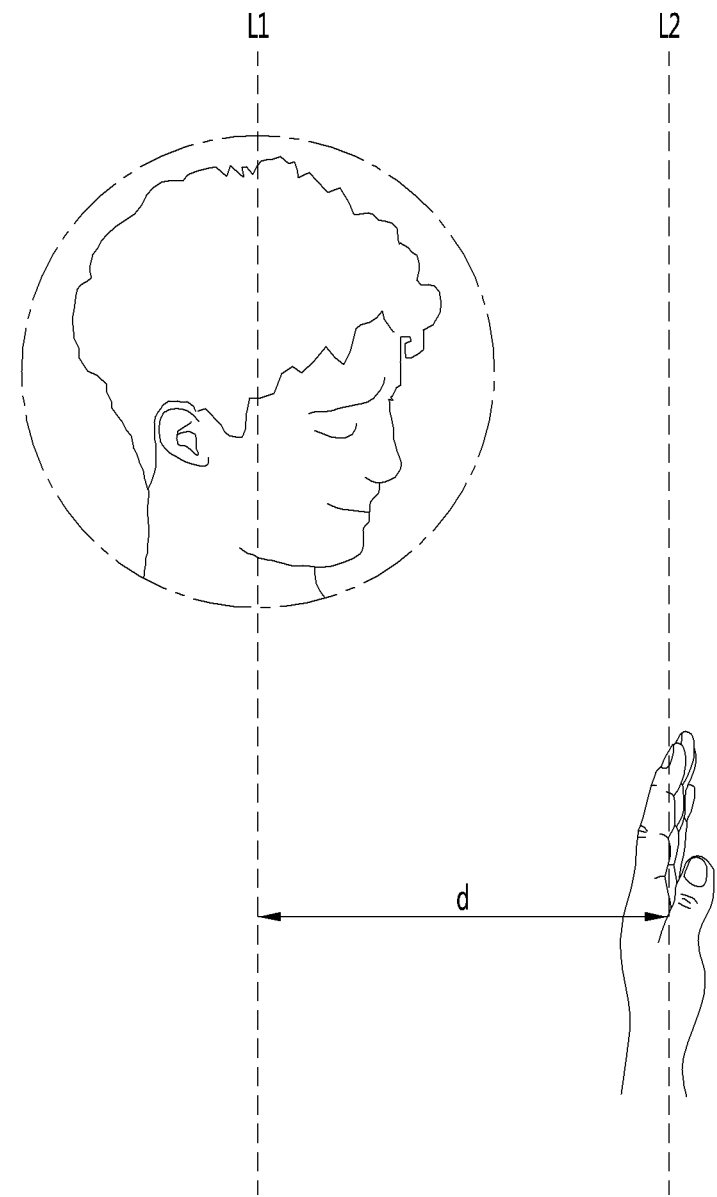

FIGS. 10A and 10B are the exemplary diagrams showing the forward-backward gesture of the user according to another embodiment of the present invention.

Referring to FIG. 10A, the video display device 100 may recognize the position of the head of the user which is the reference object and the hand which is the gesture object in the acquired video.

Further, referring to FIG. 10B, the video display device 100 may calculate the distance between the center of the reference object and the center of the gesture object. As an embodiment, the video display device 100 may calculate a distance d between the baseline L1 corresponding to the center of the head which is the reference object and the baseline L2 corresponding to the center of the hand which is the gesture object.

According to an embodiment, the video display device 100 may calculate the distance between the reference object and the gesture object based on the ratio between the reference object and the gesture object. Details will be described below with reference to FIG. 11.

Figure 11:
FIG. 11 is an exemplary diagram with regard to the ratio comparison of the object according to an embodiment of the present invention.
Figure 11:
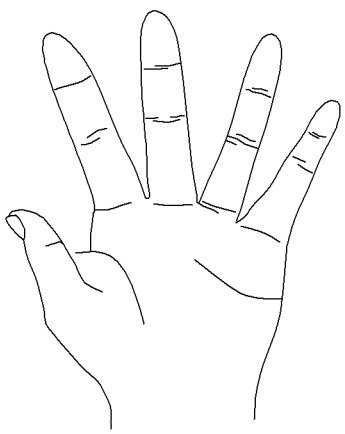
Figure 11:
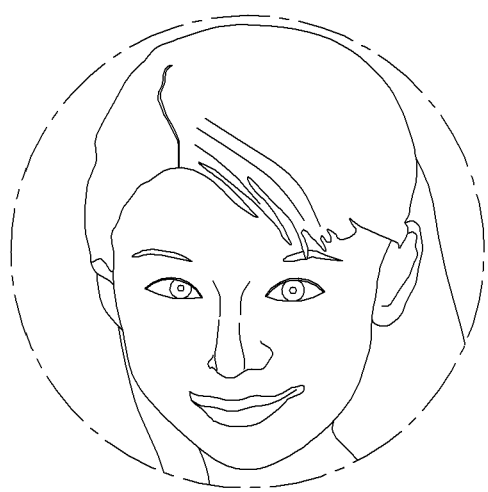
Figure 11:
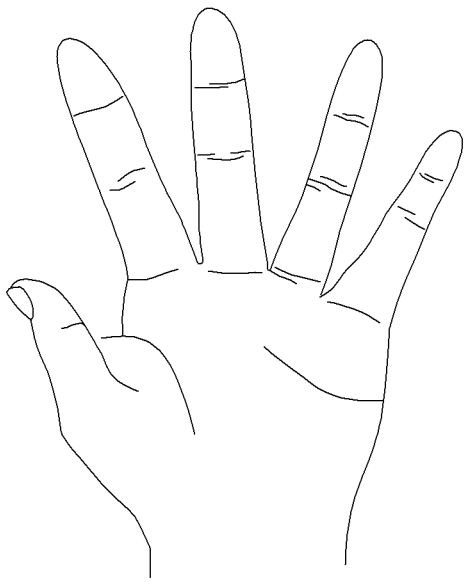

In FIG. 11, (a) and (b) are exemplary diagrams for describing ratio comparison of the object according to an embodiment of the present invention.

In FIG. 11, (a) is the case in which the head which is the reference object of the user and the hand which is the gesture object are located at the same baseline L1 as showed in FIG. 10A and, in FIG. 11, (a) is the case in which the hand of the user is located at the baseline L2 which is different from the baseline L1 as showed in FIG. 10b.

Referring to (a) of FIG. 11, the video display device 100 may calculate one or more of a size and an area of the head of the user which is the reference object and calculate one or more of a size and an area of the hand which is the gesture object in the acquired video. Further, the video display device 100 may calculate a ratio between the reference object and the gesture object based on one or more of the size and the area of the calculated reference object and one or more of the size and the area of the gesture object.

Referring to (b) of FIG. 11, the video display device 100 may calculate one or more of the size and the area of the head of the user which is the reference object and calculate one or more of the size and the area of the hand which is the gesture object in the acquired video. Further, the video display device 100 may calculate the ratio between the reference object and the gesture object based on one or more of the size and the area of the calculated reference object and one or more of the size and the area of the gesture object.

Further, the video display device 100 may calculate the distance between the reference object and the gesture object by comparing the ratio calculated in (a) of FIG. 11 and the ratio calculated in (b) of FIG. 11. Specifically, even if the position of the hand which is the gesture object is changed, the position of the head which is the reference object is identical. Accordingly, one or more of the size and the area of the head which is the reference object is identical even if the position of the hand which is the gesture object is changed. Thus, the video display device 100 may calculate the distance between the reference object and the gesture object according to the forward-backward movements of the gesture object based on the ratio between the reference object and the gesture object. Accordingly, the video display device 100 may calculate the distance between the reference object and the gesture object based on the change of the ratio between the reference object and the gesture object in accordance with the movement of the gesture object.

According to another embodiment, the video display device 100 may calculate the distance between the reference object and the gesture object based on one or more of the area, the size, and the length of the gesture object. It will be described below with reference to FIGS. 12 and 13.

First, details will be described below with regard to the fact that the video display device 100 calculates the distance between the reference object and the gesture object, based on the length of the gesture object.

FIGS. 12A and 12B are exemplary diagrams describing length comparison of the object according to an embodiment of the present invention.

Figure 12:
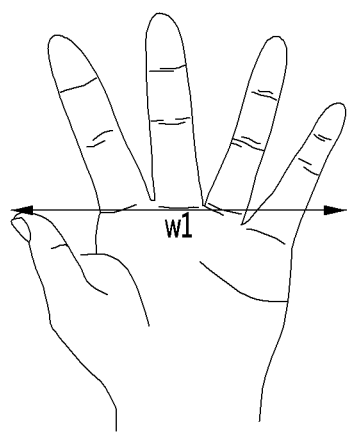
FIG. 12 is an exemplary diagram with regard to the length comparison of the object according to an embodiment of the present invention.
Figure 12:
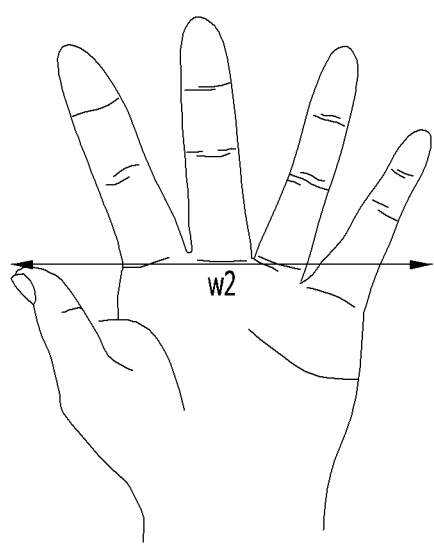

In FIG. 12, (a) is the case in which the head which is the reference object of the user and the hand which is the gesture object are located at the same baseline L1 as showed in FIG. 10A and, in FIG. 12, (b) is the case in which the hand of the user is located at the different baseline L2 which is different from the baseline L1 as showed in FIG. 10B.

Referring to (a) of FIG. 12, the video display device 100 may calculate the length of the gesture object in the acquired video. For example, the video display device 100 may calculate one or more of the length and the width of the gesture object. Accordingly, the video display device 100 may calculate w1 which is the length with regard to the width of the hand which is the gesture object.

Referring to (b) of FIG. 12, the video display device 100 may calculate the length of the gesture object in the acquired video. For example, the video display device 100 may calculate one or more of the height and the width of the gesture object. Accordingly, the video display device 100 may calculate w2 which is the length with regard to the width of the hand which is the gesture object.

Further, the video display device 100 may calculate the distance between the reference object and the gesture object by comparing the length calculated in (a) of FIG. 12 and the length calculated in (b) of FIG. 12. Specifically, even if the position of the hand which is the gesture object is changed, the actual size of the hand which is the gesture object is identical. However, the size of the gesture object is changed in the video, which is acquired by the video display device 100. Therefore, the video display device 100 may calculate the distance between the reference object and the gesture object according to the forward-backward movements of the gesture object based on the size change of the gesture object.

Further, the video display device 100 may calculate the distance between the reference object and the gesture object based on the area of the gesture object.

FIGS. 13A and 13B are exemplary diagrams for describing area comparison of the object according to an embodiment of the present invention.

Figure 13:
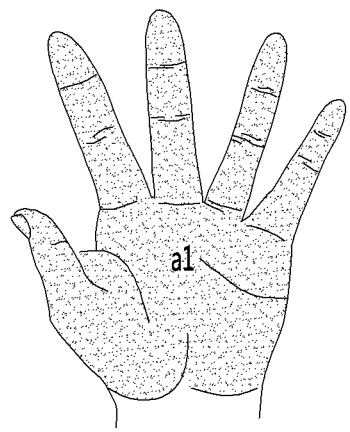
FIG. 13 is an exemplary diagram with regard to the area comparison of the object according to an embodiment of the present invention.
Figure 13:
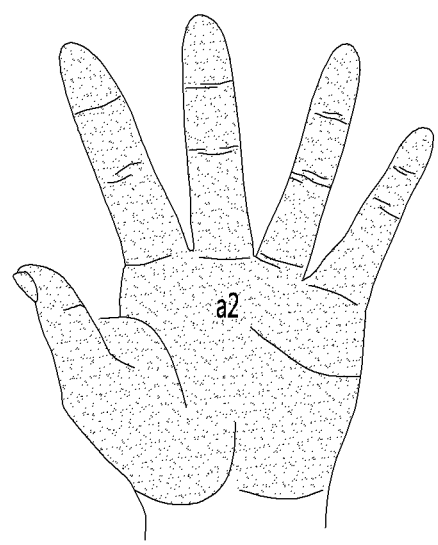

In FIG. 13, (a) is the case in which the head which is the reference object of the user and the hand which is the gesture object are located at the same baseline L1 as showed in FIG. 10A and, in FIG. 13, (b) is the case in which the hand of the user is located at the baseline L2 which is different from the baseline L1 as showed in FIG. 10B.

Referring to (a) of FIG. 13, the video display device 100 may calculate the area of the gesture object in the acquired video. For example, the video display device 100 may calculate a1 shown in black which is the area of the gesture object as showed in (a) of FIG. 13. Referring to (b) of FIG. 13, the video display device 100 may calculate the area of the gesture object in the acquired video. For example, the video display device 100 may calculate a2 showed in black which is the area of the gesture object as showed in (b) of FIG. 13.

Further, the video display device 100 may calculate the distance between the reference object and the gesture object by comparing the area calculated in (a) of FIG. 13 and the area calculated in (b) of FIG. 13. Specifically, even if the position of the hand which is the gesture object is changed, the actual area of the hand which is the gesture object is identical. However, the area of the gesture object is changed in the video, which is acquired by the video display device 100. Therefore, the video display device 100 may calculate the distance between the reference object and the gesture object according to the forward-backward movements of the gesture object based on the area change of the gesture object.

Meanwhile, according to another embodiment, the video acquisition device 160 of the video display device 100 may include the camera which may measure the distance, and, thus, it may calculate the distance between the center of the reference object and the center of the gesture object via the included camera. For example, the video acquisition device 160 may measure a distance between the reference object and the gesture object via the TOF camera (Time Of Flight Camera, not shown). In this case, the TOF camera means a camera of calculating the distance by emitting light and measuring time of flight of the emitted light and is the known technology, and, thus, the detailed description thereof will be omitted.

The video display device 100 performs the recognized gesture and operation the control operation corresponding to the calculated distance (S111).

The video display device 100 may perform the control operation corresponding to one or more of the shape and the movement of the recognized gesture and the calculated distance between the reference object and the gesture object.

Specifically, the video display device 100 may perform the control operation corresponding to the recognized gesture and the calculated distance by recognizing the recognized gesture as the control operation and recognizing the calculated distance as the control amount or the performing amount. Further, the video display device 100 may recognize the control amount or the performing amount as the positive number or the negative number according to the calculated distance.

Further, the control operation which the video display device 100 may perform may include the various control operations that the video display device 100 may perform. For example, the video display device 100 may perform one or more of control operations including the channel change operation, the volume control operation, the screen zoon-in operation, the screen zoom-out operation, the screen movement operation, the pointer movement operation, the screen setting operation and the sound setting operation.

Details will be described below with reference to FIGS. 6A to 6D.

FIGS. 6A to 6D show a left-right gesture of the user according to an embodiment of the present invention.

Referring to FIG. 6A, as an embodiment, the control unit 170 may recognize the gesture of stretching the hand which is the gesture object as the control operation of controlling the sound of the video display device 100. Further, the control unit 170 may recognize the volume control amount as a volume value of +3 if the distance between the head of the user which is the reference object and the hand which is the gesture object is d1. Accordingly, the control unit 170 may increase the volume of the video display device 100 by the volume value of +3.

Figure 6B:
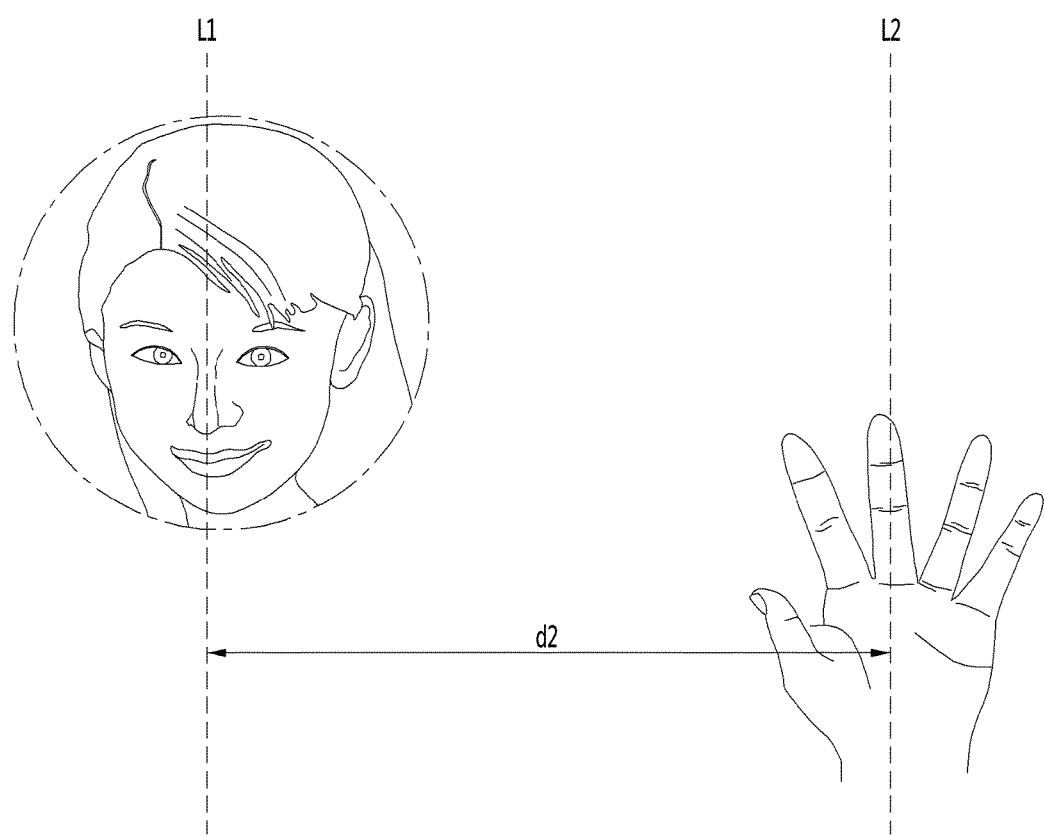

Referring to FIG. 6B, as another embodiment, the control unit 170 may recognize the gesture of stretching the hand which is the gesture object as the control operation of controlling the volume of the video display device 100. Further, the control unit 170 may recognize the volume control amount as a volume value of +5 if the distance between the head of the user which is the reference object and the hand which is the gesture object is d2. Accordingly, the control unit 170 may increase the volume of the video display device 100 by the volume value of +5.

Figure 6C:
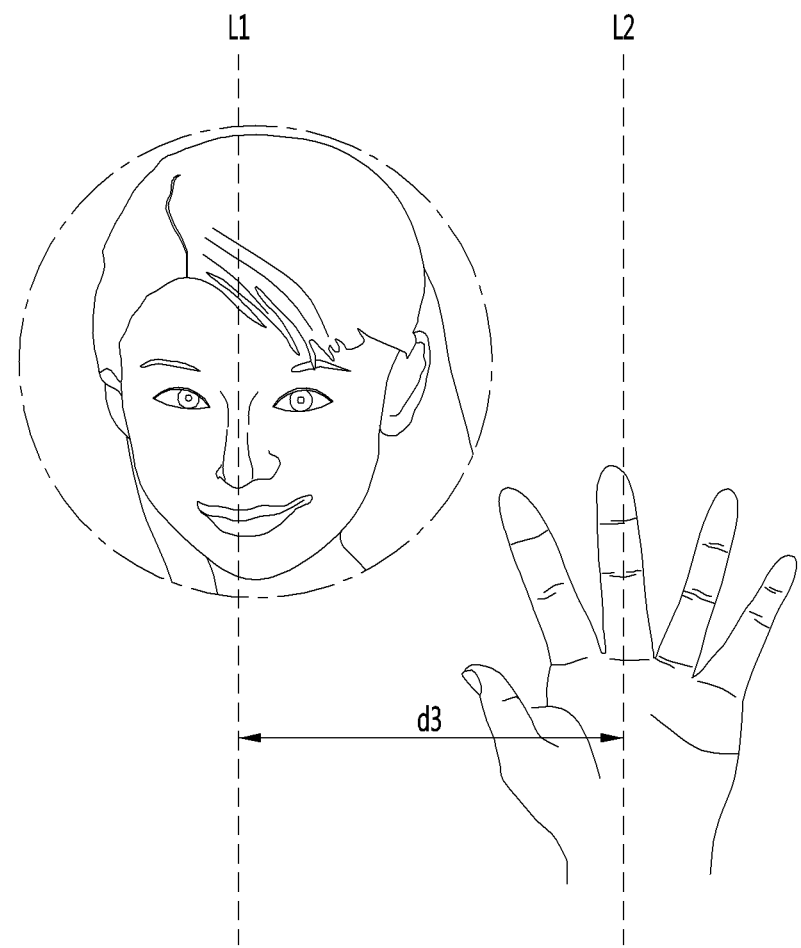

Referring to FIG. 6C as another embodiment, the control unit 170 may recognize the gesture of stretching the hand which is the gesture object as the control operation of controlling the sound of the video display device 100. Further, the control unit 170 may recognize the volume control amount by the volume value of +1 if the distance between the head of the user which is the reference object and the hand which is the gesture object is d3. Accordingly, the control unit 170 may increase the volume of the video display device 100 by the volume value of +1.

Figure 6D:
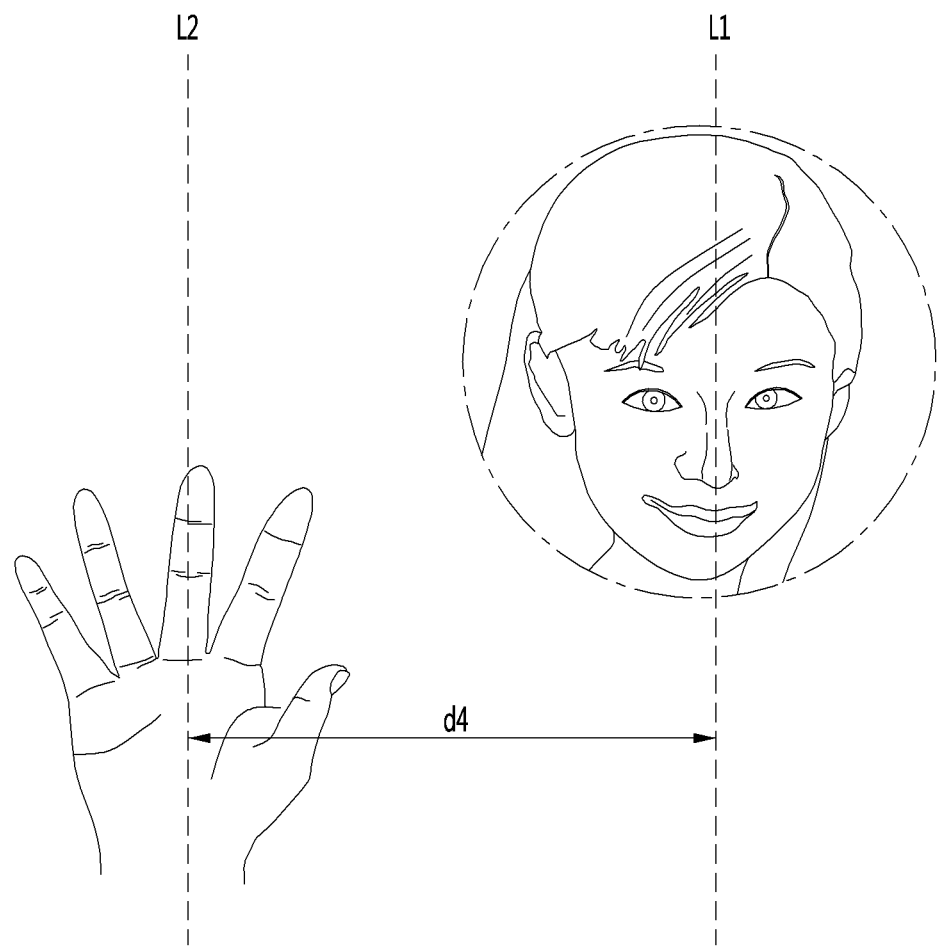

Referring to FIG. 6D as another embodiment, the control unit 170 may recognize the gesture of stretching the hand which is the gesture object as the control operation of controlling the sound of the video display device 100. Further, the control unit 170 may recognize the volume control amount by the volume value of −3 if the distance between the head of the user which is the reference object and the hand which is the gesture object is d4. Accordingly, the control unit 170 may decrease the volume of the video display device 100 by the volume value of 3.

Referring to FIGS. 14A to 14D, details will be described below with regard to the implementation of the control operation according to another embodiment of the present invention.

FIGS. 14A to 14D show the left-right gesture of the user according to another embodiment of the present invention.

Figure 14A:
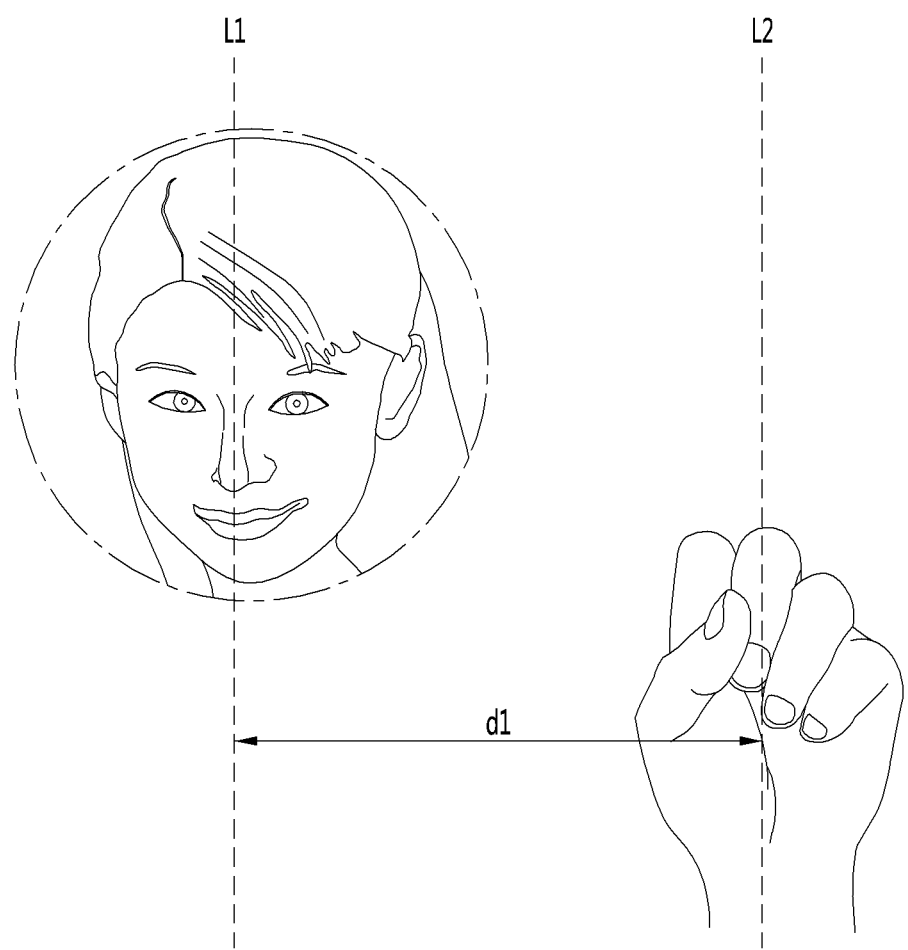
FIGS. 14A to 14D are the gesture in the left and right directions of the user according to another embodiment of the present invention.

Referring to FIG. 14A as an embodiment, the control unit 170 may recognize the gesture of clenching the user's hand which is the gesture object as the control operation of changing the displayed channel of the video display device 100. Further, the control unit 170 may recognize the channel movement amount as +3 if the distance between the head of the user which is the reference object and the hand which is the gesture object is d1. Accordingly, the control unit 170 may change the channel that the video display device 100 displays to the channel after 3 channels. For example, the video display device 100 may change as channel 13 if the channel in display is channel 10.

Figure 14B:
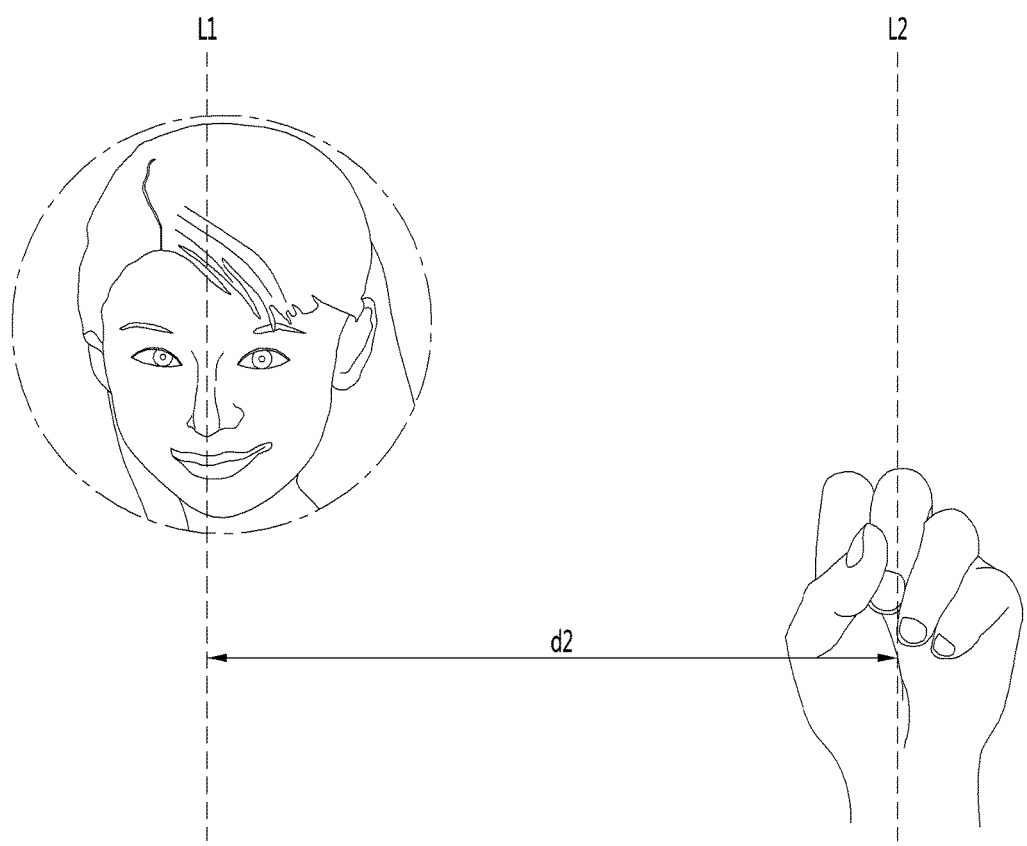

Referring to FIG. 14B as another embodiment, the control unit 170 may recognize the gesture of clenching the user's hand which is the gesture object as the control operation of changing the displayed channel of the video display device 100. Further, the control unit 170 may recognize the channel movement amount as +5 if the distance between the head of user which is the reference object and the hand which is the gesture object is d2. Accordingly, the control unit 170 may change the channel that the video display device 100 displays to the channel after 5 channels. For example, the video display device 100 may change to channel 15 if the channel in display is channel 10.

Figure 14C:
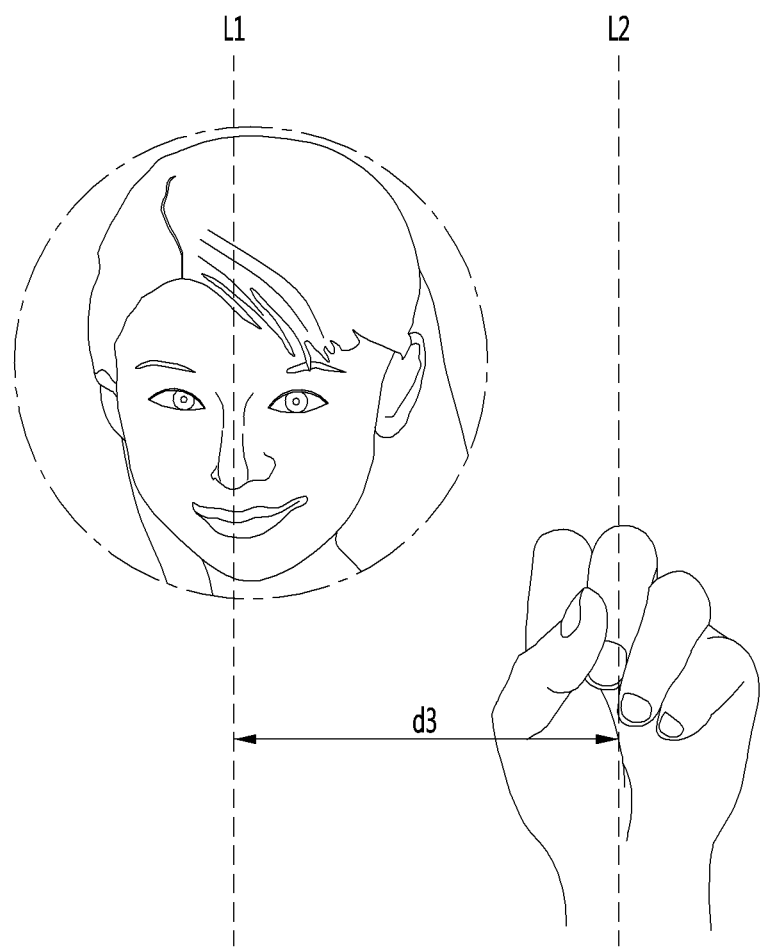

Referring to FIG. 14C as another embodiment, the control unit 170 may recognize the gesture of clenching the user's hand which is the gesture object as the control operation which changes the displayed channel of the video display device 100. Further, the control unit 170 may recognize the channel movement amount as +1 if the distance between the head of the user which is the reference object and the hand which is the gesture object is d3. Accordingly, the control unit 170 may change the channel that the video display device 100 displays to the channel after one channel. For example, the video display device 100 may change to channel 11 if the channel in display is channel 10.

Figure 14D:
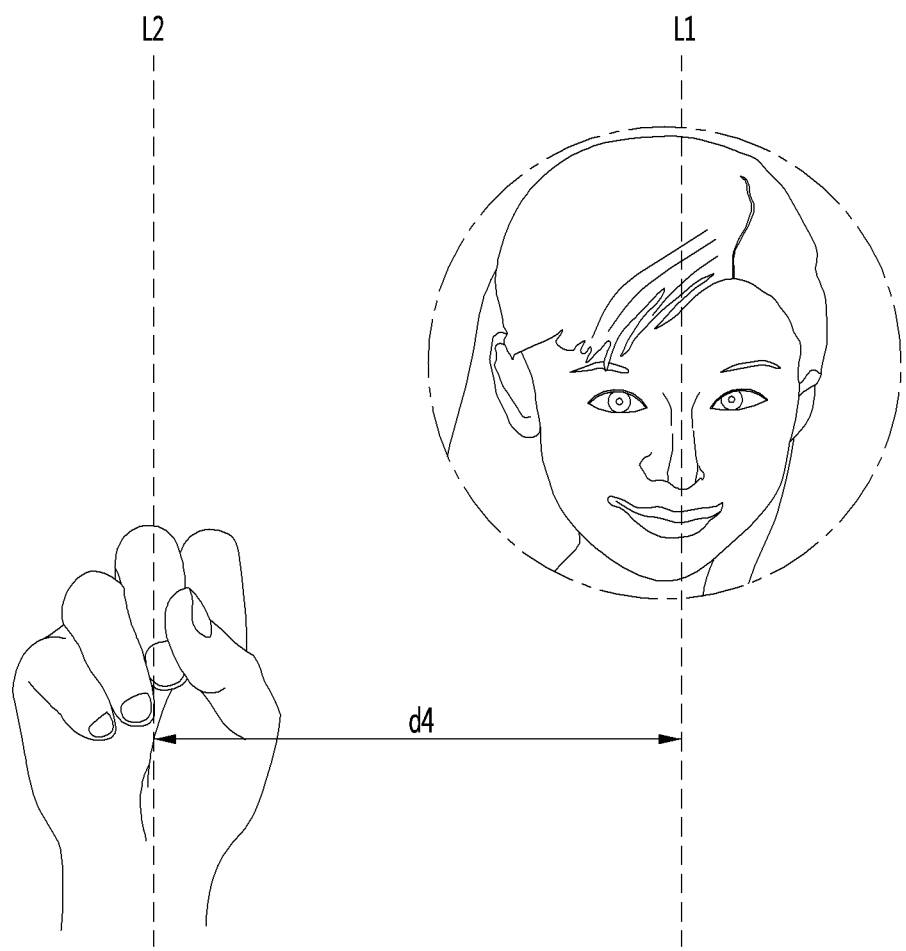

Referring to FIG. 14D as another embodiment, the control unit 170 may recognize the gesture of clenching the user's hand which is the gesture object as the control operation of changing the displayed channel of the video display device 100. Further, the control unit 170 may recognize the channel movement amount as −3 if the distance between the head of the user which is the reference object and the hand which is the gesture object is d4. Accordingly, the control unit 170 may change the channel that the video display device 100 to the channel before 3 channels. For example, the video display device 100 may change to channel 7 if the channel in display is channel 10.

Figure 7C:
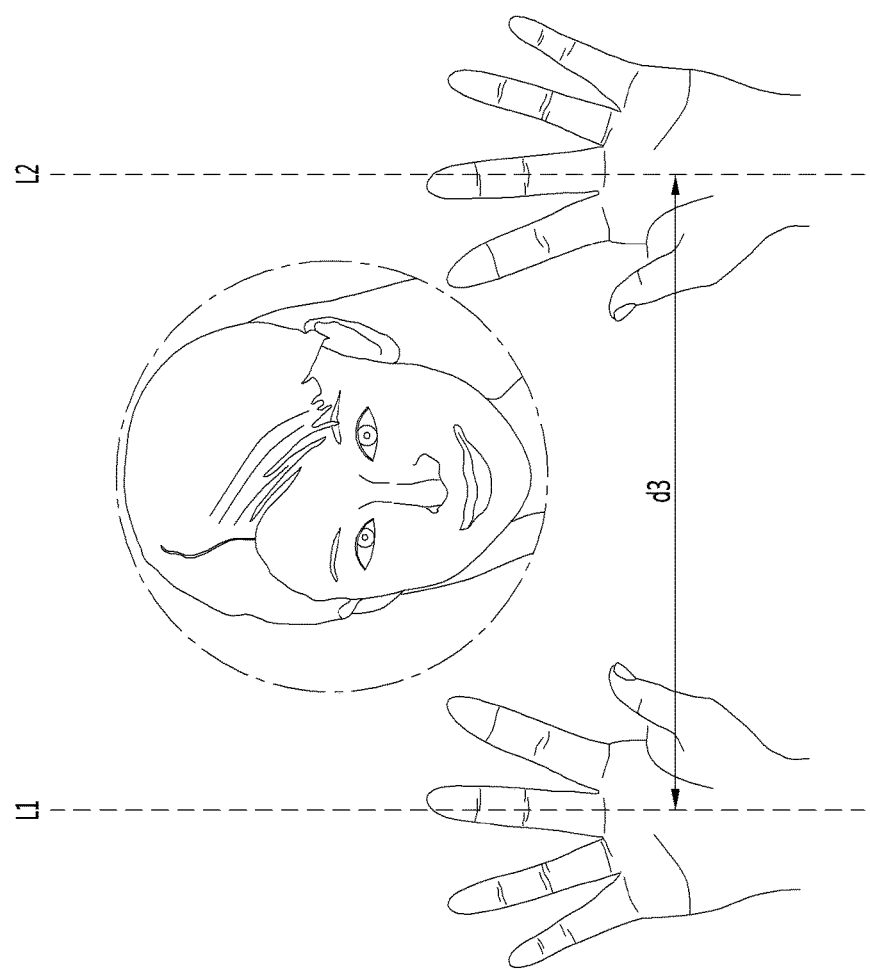

Referring to FIGS. 7A to 7C, details will be described below with regard to the implementation of the control operation according to another embodiment of the present invention.

FIGS. 7A to 7C show the left-right gesture of the user according to another embodiment of the present invention.

Referring to FIG. 7A as an embodiment, the control unit 170 may recognize the gesture of stretching two hands respectively which are the gesture objects as the control operation of adjusting the size of the screen of the video display device 100. Further, the control unit 170 may recognize one of two hands which are the gesture objects as the reference object and may recognize another hand as the gesture object. The control unit 170 may zoon in the displayed screen two times if the distance between one hand which is the reference object and another hand which is the gesture object is d1.

Referring to FIG. 7B as another embodiment, the control unit 170 may recognize the gesture of stretching two hands respectively which are the gesture objects as the control operation of adjusting the size of the screen of the video display device 100. Further, the control unit 170 may recognize one of two hands which are the gesture objects as the reference object and may recognize another hand as the gesture object. The control unit 170 may zoom in the displayed screen 3 times if the distance between one hand which is the reference object and another hand which is the gesture object is d2.

Referring to FIG. 7C as another embodiment, the control unit 170 may recognize the gesture of stretching two hands respectively which are the gesture objects as the control operation of adjusting the size of the screen of the video display device 100. Further, the control unit 170 may recognize one of two hands which are the gesture objects as the reference object and may recognize another hand as the gesture object. The control unit 170 may reduce the displayed screen 0.8 times if the distance between one hand which is the reference object and another hand which is the gesture object is d3.

Figure 8B:
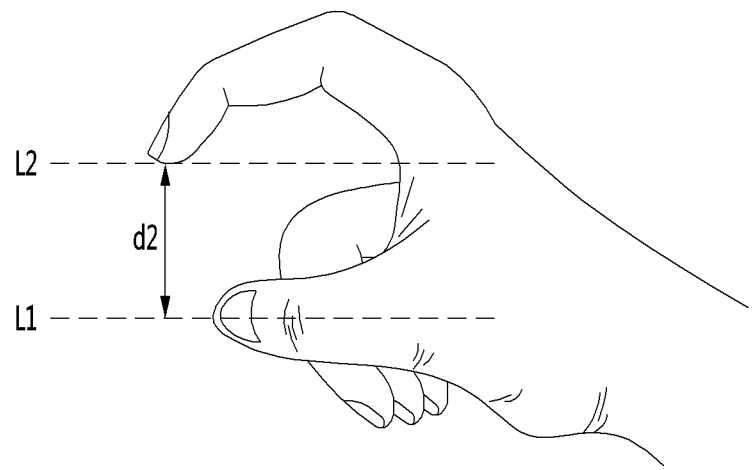
Figure 8C:
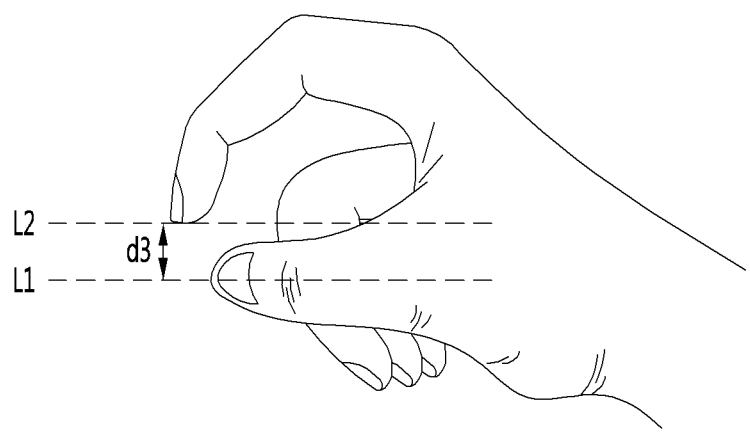

Referring to FIGS. 8A to 8C as another embodiment, details will be described below that the video display device 100 operates by recognizing the plurality of the fingers of the user as the reference object and the gesture object.

FIGS. 8A to 8C show the finger gesture of the user according to another embodiment of the present invention.

Referring to FIG. 8A as an embodiment, the control unit 170 may recognize the gesture of stretching the index finger which is the gesture object and the thumb which is the reference object as the control operation of adjusting the volume of the video display device 100. The control unit 170 may recognize the volume adjusting amount as +1 if the distance between the thumb which is the reference object and the index finger which is the gesture object is d1. Accordingly, the control unit 170 may increase the volume of the video display device 100 by the volume value of 1.

Referring to FIG. 8B as another embodiment, the control unit 170 may recognize the gesture of stretching the index finger which is the gesture object and the thumb which is the reference object as the control operation of adjusting the volume of the video display device 100. The control unit 170 may recognize the volume adjusting amount by the volume value of +3 if the distance between the thumb which is the reference object and the index finger which is the gesture object is d2. Accordingly, the control unit 170 may increase the sound of the video display device 100 by the volume value of 3.

Referring to FIG. 8C as another embodiment, the control unit 170 may recognize the gesture of stretching the index finger which is the gesture object and the thumb which is the reference object as the control operation of controlling the sound of the video display device 100. The control unit 170 may recognize the volume adjusting amount by the volume value of −1 if the distance between the index finger which is the reference object and the thumb which is the gesture object is d3. Accordingly, the control unit 170 may decrease the volume of the video display device 100 by the volume amount of 1.

Figure 9B:
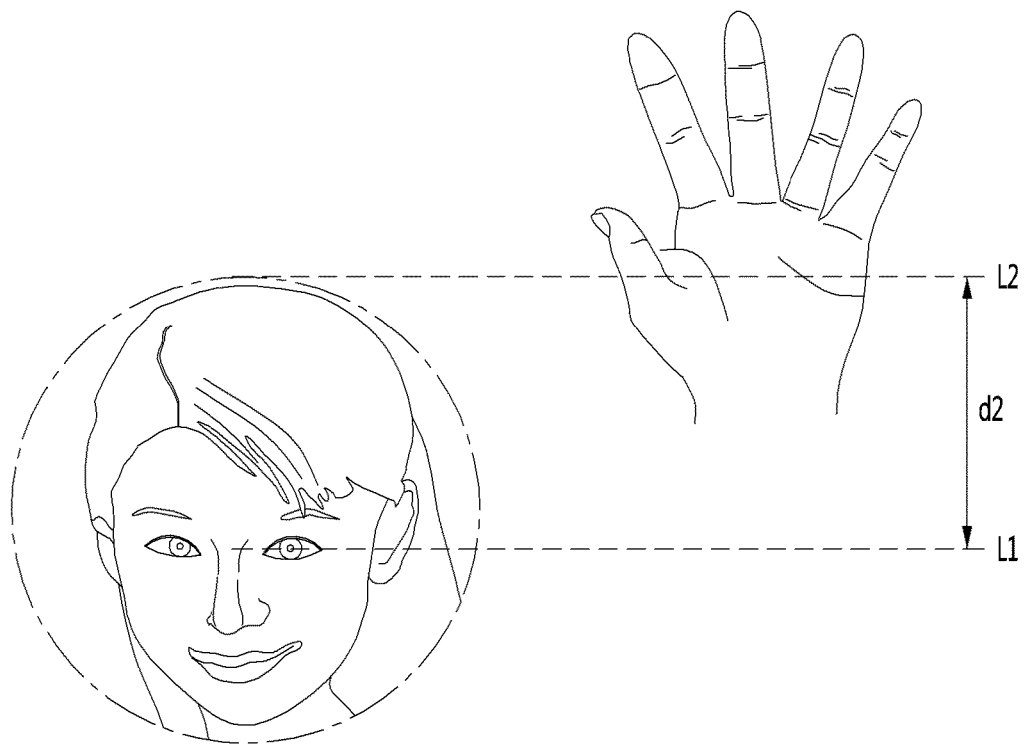
Figure 9C:
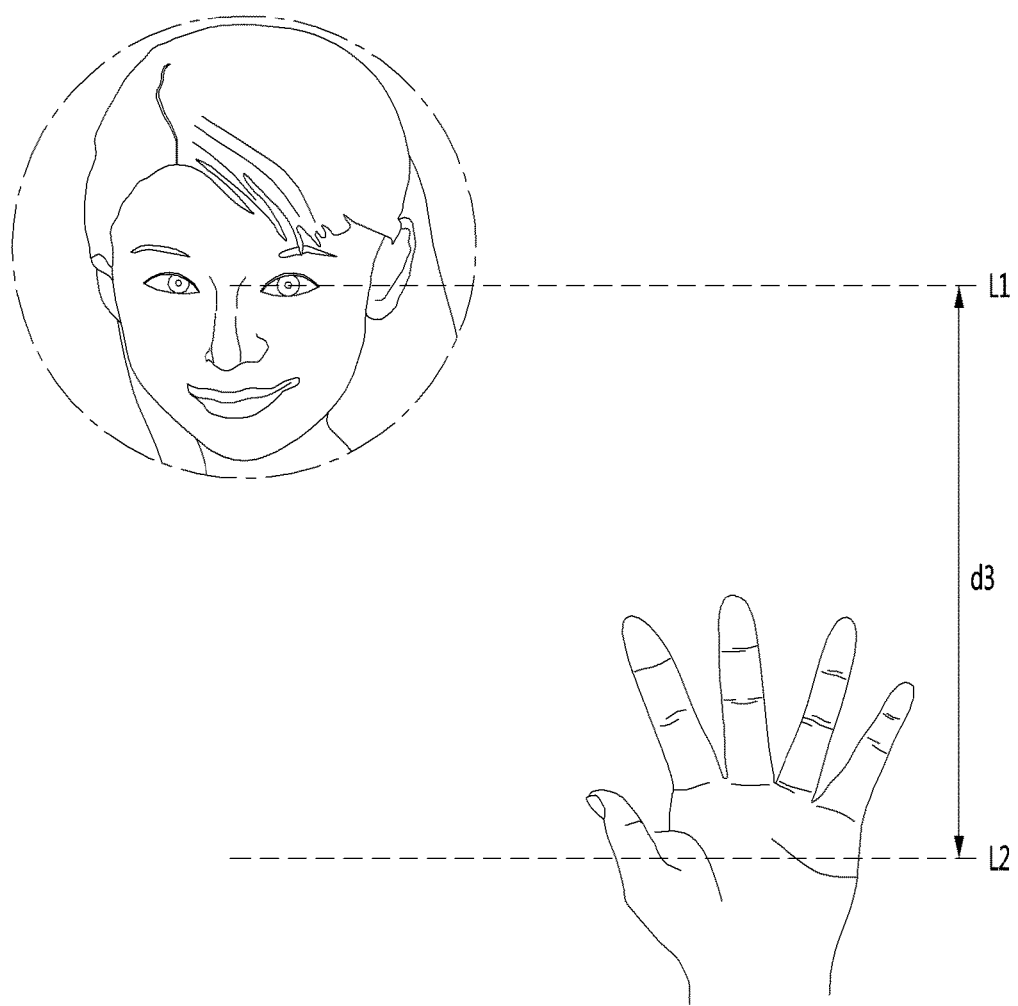

Referring to FIGS. 9A to 9C, details will be described below with regard to the implementation of the control operation according to another embodiment.

FIGS. 9A to 9C show the up-down gesture of the user according to an embodiment of the present invention.

Referring to FIG. 9A as an embodiment, the control unit 170 may recognize the gesture of stretching the hand which is the gesture object as the control operation of making one or more of the screen of the video display device 100 and the pointer displayed to the screen move. Further, the control unit 170 may recognize the movement amount by the movement value of −2 if the distance between the head of the user which is the reference object and the hand which is the gesture object is d1. Accordingly, the control unit 170 may move one or more of the screen of the video display device 100 and the pointer displayed in the screen to the downward by the movement amount of 2. For example, the video display device 100 may display the pointer with regard to the fifth channel if the pointer is in display with regard to the third channel in the list of the displayed total channel.

Referring to FIG. 9B as another embodiment, the control unit 170 may recognize the gesture of stretching the hand which is the gesture object as the control operation of moving one or more of the screen of the video display device 100 and the pointer displayed in the screen. Further, the control unit 170 may recognize the movement amount by the movement value of +1 if the distance between the head of the user which is the reference object and the hand which is the gesture object is d2. Accordingly, the control unit 170 may move one or more of the screen of the video display device 100 and the pointer displayed in the screen to the upward by the movement amount of 1. For example, the video display device 100 may display the pointer with regard to the second channel if the pointer is in display with regard to third channel in the list of the displayed total channel.

Referring to FIG. 9C with another embodiment, the control unit 170 may recognize the gesture of stretching the hand which is the gesture object as the control operation of moving one or more of the screen of the video display device 100 and the pointer displayed in the screen. Further, the control unit 170 may recognize the movement amount by the movement value of −4 if the distance between the head of the user which is the reference object and the hand which is the gesture object is d3. Accordingly, the control unit 170 may move one or more of the screen of the video display device 100 and the pointer displayed in the screen to the downward by the movement amount of 4. For example, the video display device 100 may represent the pointer with regard to the seventh channel if the pointer is in display with regard to the third channel in the list of the displayed total channel.

Control operation implementation according to the gesture of the user of the aforementioned video display device 100 is an example for the explanation and it may be established in various ways according to the selection of the user or the designer. Accordingly, the video display device 100 may perform the various control operations according to the form or the movement of the gesture and the calculated distance. For example, the video display device 100 may perform one or more control operations including the channel change operation, the volume control operation, the screen zoom-in operation, the screen zoom-out operation, the screen movement operation, the pointer movement operation, the screen setting operation, and the volume setting operation.

Further, the video display device 100 may set the control operation corresponding the gesture of the user according to the selection of the user or the designer. Accordingly, the control operation of the video display device 100 corresponding to the same gesture may be set in various ways with regard to the plurality of each users.

According to an embodiment, the above-described method can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices, and also include implementation in a carrier wave (such as data transmission through the Internet) type.

As can be seen from the foregoing, the video display device in accordance with the embodiments are not limited to the configuration and method of the embodiments described above, but all or some components of the embodiments may be configured to be selectively combined such that various modifications of the embodiments can be implemented.

What is claimed is:

1. A method of operating a video display device, comprising:
    acquiring a video associated with a user of the video display device;
    recognizing a gesture of the user in the acquired video;
    recognizing a gesture object and a reference object of the user based on the recognized gesture;
    calculating a distance between the recognized gesture object and the recognized reference object;
    calculating a control amount based on the calculated distance; and
    performing a control operation corresponding to the recognized gesture and the calculated control amount,
    wherein the calculating the control amount comprises:
    recognizing the calculated control amount as a positive number when the gesture object is located in a first direction from the reference object and recognizing the calculated control amount as a negative number when the gesture object is located in the second direction from the reference object.

2. The method according to claim 1, wherein the recognizing the gesture object and the reference object comprises recognizing a position of the gesture object and a position of the reference object in the acquired video.

3. The method according to claim 1, wherein the calculating the distance comprises calculating the distance between the gesture object and the reference object based on one or more of an area, a size, and a length of each of the gesture object and the reference object.

4. The method according to claim 1, wherein the calculating the distance comprises calculating the distance between the gesture object and the reference object based on a ratio between the gesture object and the reference object.

5. The method according to claim 1, wherein the gesture object is an object corresponding to the gesture of the user.

6. The method according to claim 1, wherein the reference object is a reference for calculating the control amount.

7. The method according to claim 1, wherein the gesture object and the reference object are different objects from each other.

8. The method according to claim 1, wherein the recognizing the gesture of the user comprises comparing one or more of a shape and a movement of the recognized gesture with one or more of a shape and a movement of a previously stored gesture.

9. The method according to claim 1, wherein the performing the control operation comprises performing one or more control operations including a channel change operation, a volume control operation, a screen zoom-in operation, a screen zoom-out operation, a screen movement operation, a pointer movement operation, a screen setting operation, and a volume setting operation.

10. A video display device, comprising:
    a video acquisition unit configured to acquire a video associated with a user of the video display device; and
    a control unit configured to recognize a gesture of the user in the acquired video associated with the user, recognize a gesture object and a reference object of the user based on the recognized gesture, calculate a distance between the recognized gesture object and the recognized reference object, calculate a control amount based on the calculated distance, and perform a control operation corresponding to the recognized gesture and the calculated control amount,
    wherein the control unit is further configured to recognize the calculated control amount as a positive number when the gesture object is located in a first direction from the reference object and recognize the calculated control amount as a negative number when the gesture object is located in a second direction from the reference object.

11. The video display device according to claim 10, wherein the control unit is further configured to calculate the distance between the gesture object and the reference object based on one or more of an area, a size, and a length of each of the gesture object and the reference object.

12. The video display device according to claim 10, wherein the control unit is further configured to calculate the distance between the gesture object and the reference object based on a ratio between the gesture object and the reference object.

13. The video display device according to claim 10, wherein the gesture object is an object corresponding to the gesture of the user.

14. The video display device according to claim 10, wherein the reference object is an object which is a reference for calculating the control amount.

15. The video display device according to claim 10, wherein the control unit is configured to perform one or more control operations including a channel change operation, a volume control operation, a screen zoon-in operation, a screen zoon-out operation, a screen movement operation, a pointer movement operation, a screen setting operation, and a volume setting operation of a video display device based on a recognized gesture and a calculated control amount.

16. The video display device according to claim 10, further comprising a storage unit storing one or more of a shape and a movement of a gesture mapped to the control amount.

17. The video display device according to claim 16, wherein the control unit is further configured to recognize the gesture of the user by comparing one or more of a shape and a movement of the recognized gesture with one or more of a shape and a movement of a previously stored gesture.

* * * * *